US011972739B2

(12) United States Patent
Monomoshi

(10) Patent No.: US 11,972,739 B2
(45) Date of Patent: Apr. 30, 2024

(54) LUMINANCE CONTROL OF BACKLIGHT IN DISPLAY OF IMAGE

(71) Applicant: NICHIA CORPORATION, Anan (JP)

(72) Inventor: Masahiko Monomoshi, Itano-gun (JP)

(73) Assignee: Nichia Corporation, Anan (JP)

( * ) Notice: Subject to any disclaimer, the term of this patent is extended or adjusted under 35 U.S.C. 154(b) by 0 days.

(21) Appl. No.: 17/677,743

(22) Filed: Feb. 22, 2022

(65) Prior Publication Data

US 2022/0277701 A1 Sep. 1, 2022

(30) Foreign Application Priority Data

Feb. 26, 2021 (JP) ................................ 2021-030120
Nov. 15, 2021 (JP) ................................ 2021-185559

(51) Int. Cl.
*G09G 3/34* (2006.01)
*G09G 3/36* (2006.01)

(52) U.S. Cl.
CPC ......... *G09G 3/3426* (2013.01); *G09G 3/3611* (2013.01); *G09G 2320/0646* (2013.01); *G09G 2360/16* (2013.01)

(58) Field of Classification Search
CPC ............... G09G 3/3426; G09G 3/3611; G09G 2320/0646; G98G 2360/16
See application file for complete search history.

(56) References Cited

U.S. PATENT DOCUMENTS 6,538,630 B1 * 3/2003 Tanaka ................ G09G 3/2011 345/94
8,531,385 B2 * 9/2013 Kim .................... G09G 3/3426 345/102
2002/0078113 A1 6/2002 Nakayama
2010/0110112 A1 5/2010 Nakanishi
2011/0043547 A1 2/2011 Nonaka et al.
2011/0057961 A1 * 3/2011 Tsuru .................... G09G 3/342 345/89
2011/0267379 A1 11/2011 Kurabayashi et al.
(Continued)

FOREIGN PATENT DOCUMENTS

JP 2002-152045 A 5/2002
JP 2003-283841 A 10/2003
(Continued)

*Primary Examiner* — Gene W Lee
(74) *Attorney, Agent, or Firm* — Kim & Stewart LLP

(57) ABSTRACT

An image display method includes generating luminance data, applying a special filter to the luminance data, generating luminance setting data, generating gradation setting data, and controlling a backlight based on the luminance setting data and a liquid crystal panel based on the gradation setting data. The luminance data indicates a luminance value for each of light-emitting regions of the backlight based on a maximum gradation value among gradation values of image pixels of an input image that correspond to the light-emitting region. The special filter is applied such that, with respect to each light-emitting region, a difference of the luminance value thereof from the luminance values of neighboring light-emitting regions decreases, and the luminance setting data is generated therefrom. The gradation setting data sets a gradation value of each pixel of the liquid crystal panel, and is generated based on the input image and the luminance setting data.

20 Claims, 28 Drawing Sheets

(56) References Cited

U.S. PATENT DOCUMENTS

| | | | |
|---|---|---|---|
| 2011/0292018 | A1 | 12/2011 | Kubota et al. |
| 2011/0304657 | A1 | 12/2011 | Yamamura et al. |
| 2017/0110070 | A1 | 4/2017 | Ikeda et al. |
| 2018/0357166 | A1 | 12/2018 | Yu et al. |

FOREIGN PATENT DOCUMENTS

| | | | |
|---|---|---|---|
| JP | 2010-134435 | A | 6/2010 |
| JP | 2011-232590 | A | 11/2011 |
| JP | 2011-248215 | A | 12/2011 |
| JP | 2015-176137 | A | 10/2015 |
| JP | 2017-076110 | A | 4/2017 |
| WO | 2010/131359 | A1 | 11/2010 |
| WO | 2011/039996 | A1 | 4/2011 |

* cited by examiner

LUMINANCE CONTROL OF BACKLIGHT IN DISPLAY OF IMAGE

CROSS-REFERENCE TO RELATED APPLICATIONS

This application is based upon and claims the benefit of priority from the prior Japanese Patent Application No. 2021-030120, filed on Feb. 26, 2021; and Japanese Patent Application No. 2021-185559, filed on Nov. 15, 2021; the entire contents of which are incorporated herein by reference.

FIELD

Embodiments relate to an image display method and a display that performs the same.

BACKGROUND

A conventionally-known image display device includes a backlight and a liquid crystal panel. The backlight includes multiple light-emitting regions arranged in a matrix configuration and light sources in the light-emitting regions. The liquid crystal panel is located above the backlight and includes multiple pixels. By using such an image display device, luminances of the light-emitting regions can be set differently depending on the image to be displayed on the liquid crystal panel. Also, gradations of the pixels of the liquid crystal panel can be set according to the set luminances of the light-emitting regions. The contrast of the image can be improved thereby. Such technology is called "local dimming".

A backlight that is used for the local dimming may have a structure in which light can propagate (i.e., leak) between the adjacent light-emitting regions. When a backlight having such a structure is used for the local dimming, the leakage of the light becomes more significant and thus noticeable by users as a difference between setting values of luminances of the adjacent light-emitting regions increases. Such a phenomenon is called a "halo phenomenon".

SUMMARY

Embodiments are directed to an image display method and a display in which the halo phenomenon can be suppressed.

An image display method includes generating luminance data, applying a special filter to the luminance data, generating luminance setting data, generating gradation setting data, and controlling a backlight to operate based on the luminance setting data and a liquid crystal panel to operate based on the gradation setting data to display an image corresponding to an input image. The luminance data indicates a luminance value for each of a plurality of light-emitting regions of the backlight, which is configured in a matrix form, based on a maximum gradation value among gradation values of image pixels of the input image that correspond to the light-emitting region. The special filter is applied to the luminance data, such that, with respect to each of the light-emitting regions, a difference of the luminance value thereof from the luminance values of neighboring light-emitting regions thereof decreases, and the luminance setting data is generated therefrom. The gradation setting data sets a gradation value of each of a plurality of pixels of the liquid crystal panel, which is coupled to the backlight, for the input image, and is generated based on the input image and the luminance setting data.

According to embodiments, the halo phenomenon can be suppressed.

DETAILED DESCRIPTION

Figure 1:
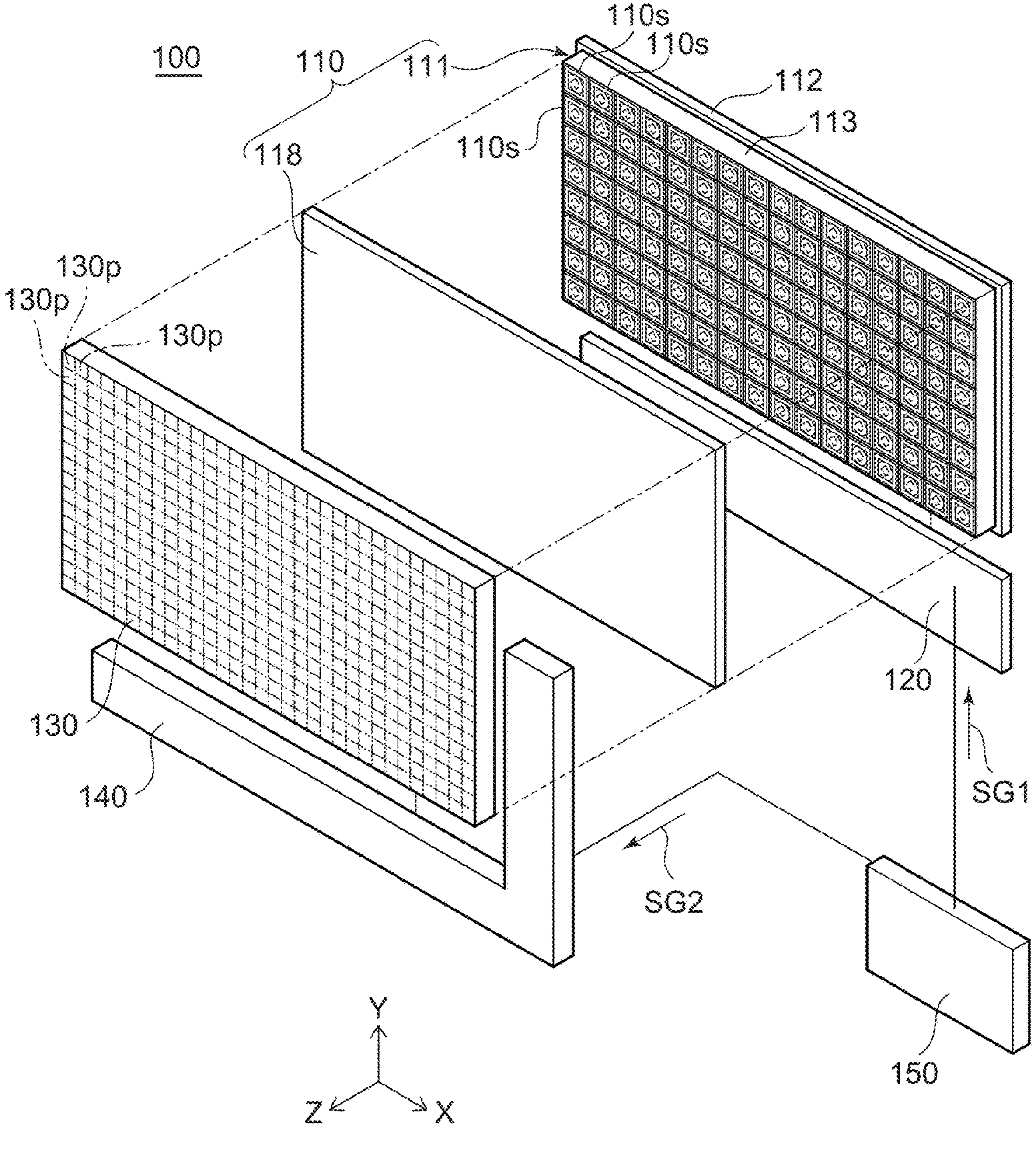
FIG. 1 illustrates an exploded perspective view of an image display device according to a first embodiment.

Exemplary embodiments will now be described with reference to the drawings. The drawings are schematic or conceptual; and the relationships between the thickness and width of portions, the proportional coefficients of sizes among portions, etc., are not necessarily the same as actual values thereof. Furthermore, the dimensions and proportional coefficients may be illustrated differently among drawings, even for identical portions. In the specification and the drawings of the application, components similar to those described in regard to a drawing hereinabove are marked with like reference numerals, and a detailed description is omitted as appropriate.

For easier understanding of the following description, arrangements and configurations of portions of an image display device are described using an XYZ orthogonal coordinate system. X-axis, Y-axis, and Z-axis are orthogonal to each other. The direction in which the X-axis extends is referred to as an "X-direction"; the direction in which the Y-axis extends is referred to as a "Y-direction"; and the direction in which the Z-axis extends is referred to as a "Z-direction". For easier understanding of the description, the Z-direction is called up, and the opposite direction is called down, but these directions are independent of the direction of gravity. For easier understanding of the description of the drawings, the X-axis direction in the direction of the arrow is referred to as the "+X direction"; and the opposite direction is referred to as the "−X direction". Similarly, the Y-axis direction in the direction of the arrow is referred to as the "+Y direction"; and the opposite direction is referred to as the "−Y direction".

First Embodiment

First, a first embodiment will be described.

FIG. 1 illustrates an exploded perspective view of an image display device according to the first embodiment.

An image display device 100 according to the first embodiment is, for example, a liquid crystal module (LCM) used in the display of a device such as a television, a personal computer, a game machine, etc. The image display device 100 includes a backlight 110, a driver 120 for the backlight, a liquid crystal panel 130, a driver 140 for the liquid crystal panel, and a controller 150. Components of the image display device 100 will be described hereinafter. For easier understanding of the description, the electrical connections between the components are shown by connecting the components to each other with solid lines in FIG. 1.

The backlight 110 is compatible with local dimming. The backlight 110 includes a planar light source 111, and an optical member 118 located on the planar light source 111.

Although not particularly limited, the optical member 118 is, for example, a sheet, a film, or a plate that has a light-modulating function such as a light-diffusing function, etc. According to the present embodiment, the number of the optical members 118 included in the backlight 110 is one. However, the number of optical members included in the backlight may be two or more.

Figure 2:
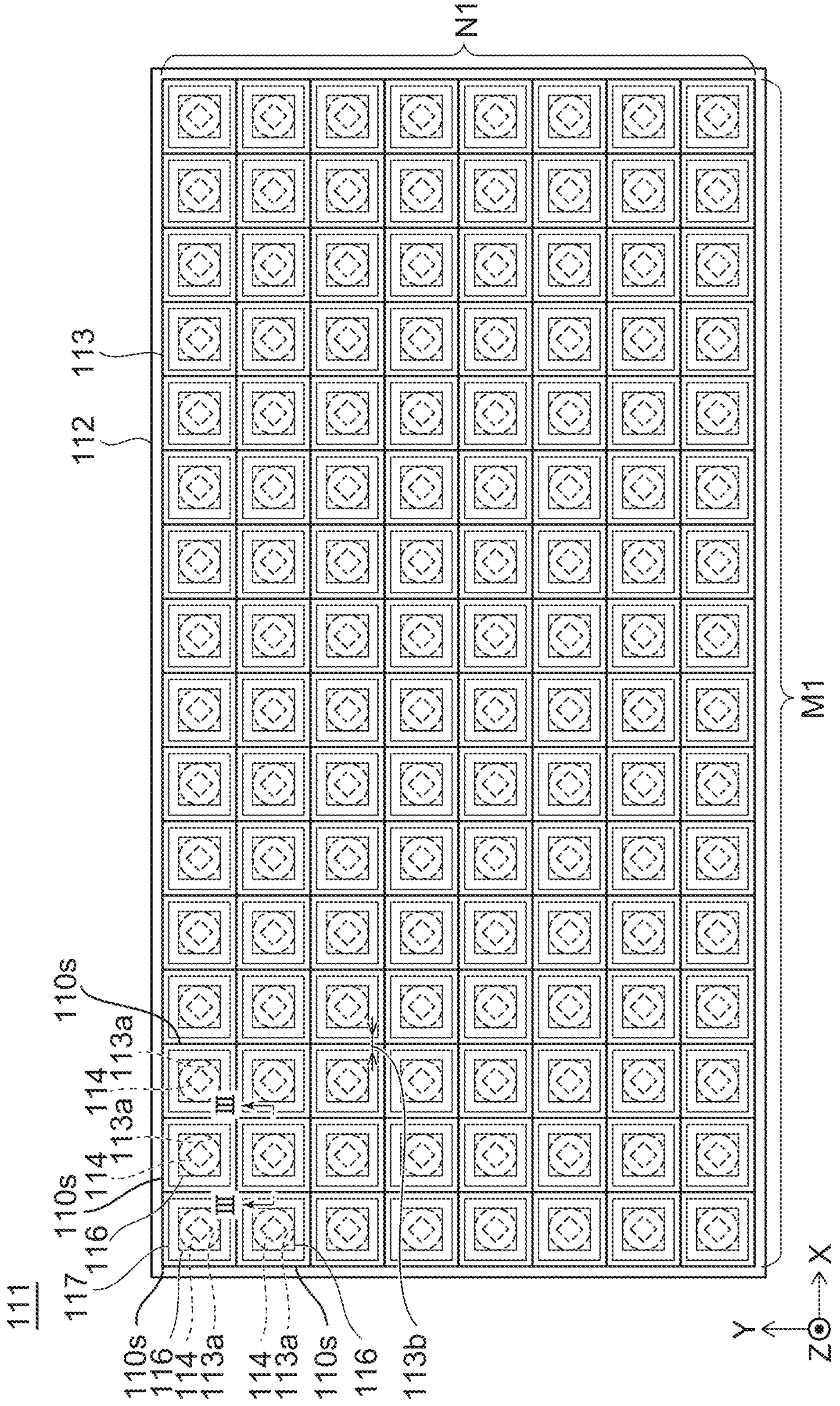
FIG. 2 illustrates a top view of a planar light source of a backlight included in the image display device according to the first embodiment.

FIG. 2 illustrates a top view of the planar light source 111 of the backlight 110 included in the image display device 100 according to the first embodiment.

Figure 3:
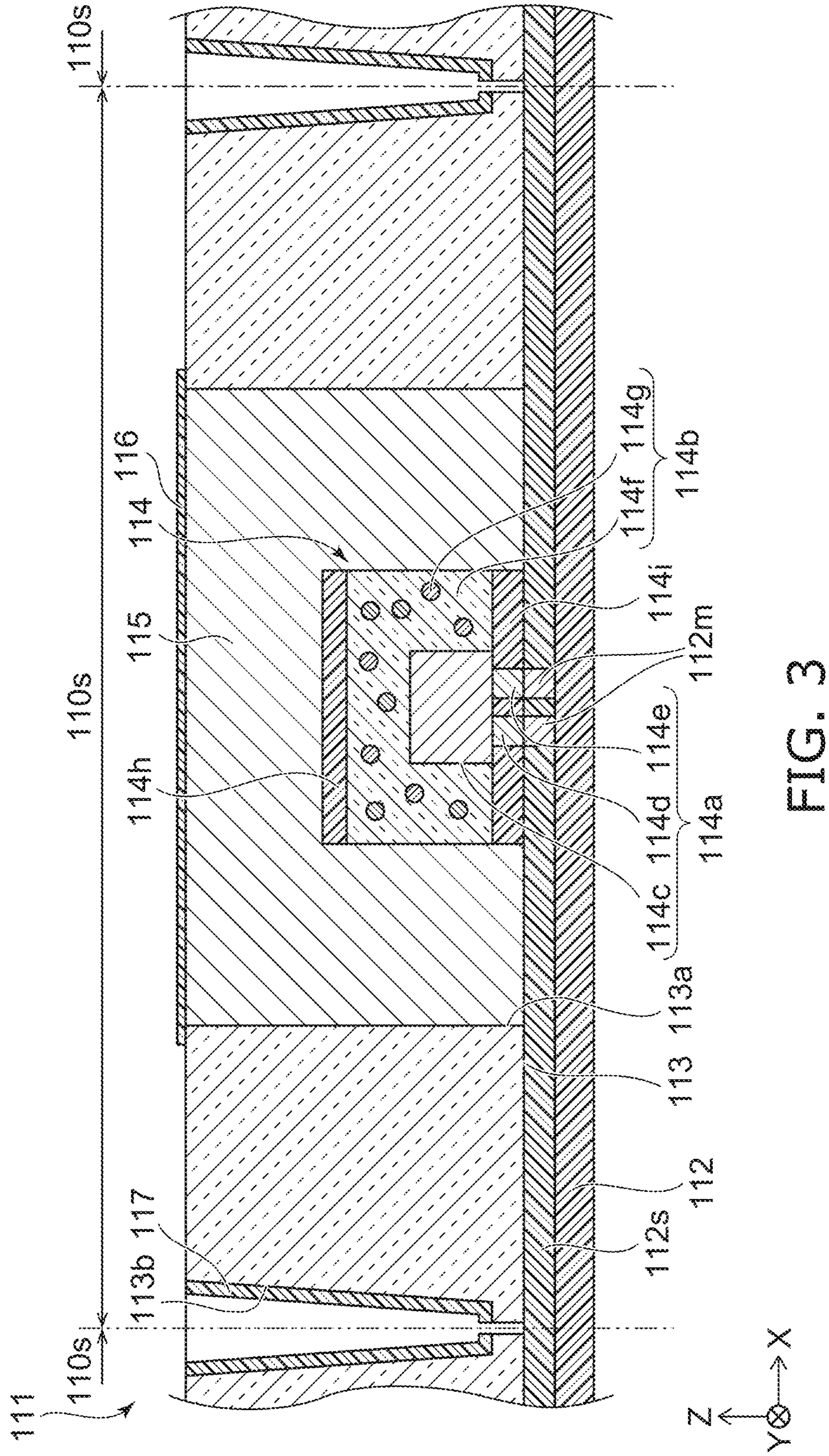
FIG. 3 illustrates a cross-sectional view of the planar light source along line III-III in FIG. 2.

FIG. 3 illustrates a cross-sectional view of the planar light source 111 along line III-III in FIG. 2.

According to the first embodiment as shown in FIGS. 2 and 3, the planar light source 111 includes a substrate 112, a light-reflective sheet **112*s*, a light guide member 113, multiple light sources 114, a light-transmitting member 115, a first light-modulating member 116, and a light-reflecting member 117**.

The substrate 112 is a wiring substrate that includes an insulating member, and multiple wiring located in the insulating member. According to the present embodiment, the shape of the substrate 112 in top-view is substantially rectangular as shown in FIG. 2. However, the shape of the substrate is not limited to the aforementioned shape. The upper surface and the lower surface of the substrate 112 are flat surfaces and are substantially parallel to the X-direction and the Y-direction.

As shown in FIG. 3, the light-reflective sheet **112*s* is located on the substrate 112. According to the present embodiment, the light-reflective sheet 112*s* includes a first adhesive layer, a light-reflecting layer on the first adhesive layer, and a second adhesive layer on the light-reflecting layer. The light-reflective sheet 112*s* is adhered to the substrate 112** with the first adhesive layer.

The light guide member 113 is located on the light-reflective sheet **112*s*. At least a portion of the lower surface of the light guide member 113 is adhered to the light-reflective sheet 112*s* with the second adhesive layer. According to the present embodiment, the light guide member 113 is plate-shaped. The thickness of the light guide member 113 is favorably, for example, not less than 200 μm and not more than 800 μm. In the thickness direction, the light guide member 113 may include a single layer or may include a stacked body of multiple layers. According to the present embodiment, the shape of the light guide member 113 in top-view is substantially rectangular as shown in FIG. 2**. However, the shape of the light guide member is not limited to the aforementioned shape.

For example, a thermoplastic resin such as acrylic, polycarbonate, cyclic polyolefin, polyethylene terephthalate, polyester, or the like, an epoxy, a thermosetting resin such as silicone or the like, and glass, etc., can be used as a material used for the light guide member 113.

Multiple light source placement portions **113*a* are located in the light guide member 113. The multiple light source placement portions 113*a* are arranged in a matrix configuration in top-view. According to the present embodiment as shown in FIG. 3, each light source placement portion 113*a* is a through-hole that extends through the light guide member 113 in the Z-direction. Alternatively, the light source placement portion 113*a* may be a bottomed recess located at the lower surface of the light guide member 113**.

The light sources 114 are located in the light source placement portions **113*a*, respectively. Accordingly, as shown in FIG. 2, multiple light sources 114 also are arranged in a matrix configuration. However, it is not always necessary for the light guide member 113 to be included in the planar light source 111. For example, the planar light source 111 may not include a light guide member, and the multiple light sources 114 may simply be arranged in a matrix configuration on the substrate 112. When no light guide member is included, the light source placement portion refers to a portion of the substrate 112 in which the light source 114** is located.

Each light source 114 may be a single light-emitting element or may include a light-emitting device in which, for example, a wavelength conversion member or the like is combined with a light-emitting element. According to the present embodiment as shown in FIG. 3, each light source 114 includes a light-emitting element 114*a*, a wavelength conversion member 114*b*, a second light-modulating member 114*h*, and a third light-modulating member 114*i*.

The light-emitting element 114*a* is, for example, an LED (Light-Emitting Diode) and includes a semiconductor stacked body 114*c* and a pair of electrodes 114*d* and 114*e* that electrically connects the semiconductor stacked body 114*c* and the wiring of the substrate 112. Through-holes are provided in portions of the light-reflective sheet 112*s* positioned directly under the electrodes 114*d* and 114*e*. Conductive members 112*m* that electrically connect the substrate 112 and the electrodes 114*d* and 114*e* are located in the through-holes.

The wavelength conversion member 114*b* includes a light-transmitting member 114*f* that covers an upper surface and side surfaces of the semiconductor stacked body 114*c*, and a wavelength conversion substance 114*g* that is located in the light-transmitting member 114*f* and converts the wavelength of the light emitted by the semiconductor stacked body 114*c* into a different wavelength. The wavelength conversion substance 114*g* is, for example, a phosphor.

According to the present embodiment, the light-emitting element 114*a* emits blue light. On the other hand, the wavelength conversion member 114*b* includes, for example, a phosphor that converts incident light into red light (hereinbelow, called a red phosphor) such as a CASN-based phosphor (e.g., $CaAlSiN_3$:Eu), a quantum dot phosphor (e.g., $AgInS_2$ or $AgInSe_2$), a KSF-based phosphor (e.g., $K_2SiF_6$:Mn), a KSAF-based phosphor (e.g., $K_2(Si, Al)F_6$:Mn, and more specifically $K_2Si_{0.99}Al_{0.01}F_{5.99}$:Mn), or the like, a phosphor that converts incident light into green light (hereinbelow, called a green phosphor) such as a phosphor that has a perovskite structure (e.g., $CsPb(F, Cl, Br, I)_3$), a quantum dot phosphor (e.g., CdSe or InP), a β-sialon-based phosphor (e.g., $(Si, Al)_3(O, N)_4$:Eu), a LAG-based phosphor (e.g., $Lu_3(Al, Ga)_5O_{12}$:Ce), etc. Thereby, the backlight 110 can emit white light, which is a combination of the blue light emitted by the light-emitting element 114*a* and the red light and the green light from the wavelength conversion member 114*b*. The wavelength conversion member 114*b* may be a light-transmitting member that does not include any phosphor; in such a case, for example, a similar white light can be obtained by providing a phosphor sheet that includes a red phosphor and a green phosphor on the planar light source, or by providing a phosphor sheet including a red phosphor and a phosphor sheet including a green phosphor on the light guide member.

It is favorable for the KSAF-based phosphor to include the composition of the following Formula (I).

$$M_2[Si_pAl_qMn_rF_s] \quad (I)$$

In Formula (I), M is an alkaline metal; it is favorable for M to include at least K. It is favorable for Mn to be a tetravalent Mn ion. It is favorable for p, q, r, and s to satisfy $0.9 \le p+q+r \le 1.1$, $0<q \le 0.1$, $0<r \le 0.2$, and $5.9 \le s \le 6.1$. It is more favorable for $0.95 \le p+q+r \le 1.05$ or $0.97 \le p+q+r \le 1.03$; and for $0<q \le 0.03$, $0.002 \le q \le 0.02$, or $0.003 \le q \le 0.015$; and for $0.005 \le r \le 0.15$, $0.01 \le r \le 0.12$, or $0.015 \le r \le 0.1$; and for $5.92 \le s \le 6.05$ or $5.95 \le s \le 6.025$. The compositions of $K_2[Si_{0.946}Al_{0.005}Mn_{0.049}F_{5.995}]$, $K_2[Si_{0.942}Al_{0.008}Mn_{0.050}F_{5.992}]$, and $K_2[Si_{0.939}Al_{0.014}Mn_{0.047}F_{5.986}]$ are examples. According to such a KSAF-based phosphor, a red light that has high luminance and a narrow width at half maximum of the light emission peak wavelength can be obtained.

The second light-modulating member 114*h* is located at an upper surface of the wavelength conversion member 114*b* and can modify the amount and/or the emission direction of the light emitted from the upper surface of the wavelength conversion member 114*b*. The third light-modulating member 114*i* is located at the lower surface of the light-emitting element 114*a* and the lower surface of the wavelength conversion member 114*b* so that the lower surfaces of the electrodes 114*d* and 114*e* are exposed. The third light-modulating member 114*i* can reflect the light oriented toward a lower surface of the wavelength conversion member 114*b* to the upper surface and side surfaces of the wavelength conversion member 114*b*. The second light-modulating member 114*h* and the third light-modulating member 114*i* each can include a light-transmitting resin, a light-diffusing agent included in the light-transmitting resin, etc. The light-transmitting resin is, for example, a silicone resin, an epoxy resin, or an acrylic resin. For example, particles of $TiO_2$, $SiO_2$, $Nb_2O_5$, $BaTiO_3$, $Ta_2O_5$, $Zr_2O_3$, $Y_2O_3$, $Al_2O_3$, ZnO, MgO, $BaSO_4$, glass, etc., are examples of the light-diffusing agent. The second light-modulating member 114*h* may also include a metal member such as, for example, Al, Ag, etc., so that the luminance directly above the light source 114 does not become too high.

The light-transmitting member 115 is located in the light source placement portion 113*a*. The light-transmitting member 115 covers the light source 114. The first light-modulating member 116 is located on the light-transmitting member 115. The first light-modulating member 116 can reflect a portion of the light incident from the light-transmitting member 115 and can transmit another portion of the light so that the luminance directly above the light source 114 does not become too high. The first light-modulating member 116 can include a member similar to the second light-modulating member 114*h* or the third light-modulating member 114*i*.

A partitioning trench 113*b* is provided in the light guide member 113 to surround the light source placement portions 113*a* in top-view. High noticeability of the halo phenomenon can be suppressed by the partitioning trench 113*b* reflecting a portion of the light from the light source 114. The partitioning trench 113*b* extends in a lattice shape in the X-direction and the Y-direction. The partitioning trench 113*b* extends through the light guide member 113 in the Z-direction. Alternatively, the partitioning trench 112*b* may be a recess provided in the upper surface or the lower surface of the light guide member 113. Also, the partitioning trench 112*b* may not be provided in the light guide member 113.

The light-reflecting member 117 is located in the partitioning trench 113*b*. The high noticeability of the halo phenomenon can be further suppressed by the light-reflecting member 117 reflecting a portion of the light from the light source. For example, a light-transmitting resin that includes a light-diffusing agent can be used as the light-reflecting member 117. For example, particles of $TiO_2$, $SiO_2$, $Nb_2O_5$, $BaTiO_3$, $Ta_2O_5$, $Zr_2O_3$, ZnO, $Y_2O_3$, $Al_2O_3$, MgO, $BaSO_4$, glass, etc., are examples of the light-diffusing agent. For example, a silicone resin, an epoxy resin, an acrylic resin, etc., are examples of the light-transmitting resin. For example, a metal member such as Al, Ag, etc., may be used as the light-reflecting member 117. The light-reflecting member 117 covers a portion of side surfaces of the partitioning trench 113*b* in a layer shape. Alternatively, the light-reflecting member 117 may fill the entire interior of the partitioning trench 112*b*. Also, no light-reflecting member may be located in the partitioning trench 112*b*.

According to the present embodiment, present of the multiple light sources 114 is individually controllable by the driver 120 for the backlight. Here, "controllable light emission" means that switching between lit and unlit is possible, and the luminance in the lit state is adjustable. For example, the planar light source may have a structure in which the light emission is controllable for each light source, or may have a structure in which multiple light source groups are arranged in a matrix configuration, and the light emission is controllable for each light source group.

In the specification, the subdivided regions of the planar light source each of which includes a light source or a light source group that are individually controllable are called "light-emitting regions". In other words, the light-emitting region means the minimum region of the backlight of which the luminance is controllable by local dimming. Accordingly, according to the present embodiment, similarly to the partitioning trench 113*b*, the regions of the planar light source 111 partitioned into a lattice shape correspond to light-emitting regions 110*s*.

Each light-emitting region 110*s* is rectangular. According to the present embodiment, one light source 114 is located in one light-emitting region 110*s*. Then, the luminances of the multiple light-emitting regions 110*s* are individually controlled by the driver 120 for the backlight individually controlling the light emission of the multiple light sources 114. As described above, when the light emission is controlled for each of multiple light source groups, one light source group, i.e., multiple light sources, is located in one light-emitting region; and the multiple light sources are simultaneously lit or unlit.

The multiple light-emitting regions 110*s* are arranged in a matrix configuration in top-view. Hereinbelow, in the structure of a matrix configuration such as that of the multiple light-emitting regions 110*s*, the element group of the matrix of the light-emitting region 110*s*, etc., arranged in the X-direction is called a "row"; and the element group of the matrix of the light-emitting region 110*s*, etc., arranged in the Y-direction is called a "column". For example, as shown in FIG. 2, the row that is positioned furthest in the +Y direction (the row positioned uppermost when viewed according to a direction of reference numerals) is referred to as the "first row"; and the row that is positioned furthest in the −Y direction (the row positioned lowermost when viewed according to the direction of reference numerals) is referred to as the "final row". Similarly, as shown in FIG. 2, the column that is positioned furthest in the −X direction (the column positioned leftmost when viewed according to the direction of reference numerals) is referred to as the "first column"; and the column that is positioned furthest in the +X direction (the column positioned rightmost when viewed according to the direction of reference numerals) is referred to as the "final column". The multiple light-emitting regions 110*s* are arranged in N1 rows and M1 columns. Here, N1 and M1 each are any integer; an example is shown in FIG. 2 in which N1 is 8 and M1 is 16.

Although the partitioning trench 113*b* and the light-reflecting member 117 are included in the planar light source 111 as shown in FIG. 3, the adjacent light-emitting regions 110*s* are not perfectly shielded. Therefore, light can propagate between the adjacent light-emitting regions 110*s*. Accordingly, the light that is emitted by the light source 114 in one light-emitting region 110*s* when the light source is lit may propagate to the adjacent light-emitting regions 110*s* at the periphery of the one light-emitting region 110*s*.

As shown in FIG. 1, the driver 120 for the backlight is connected to the substrate 112 and the controller 150. The driver 120 for the backlight includes a drive circuit that drives the multiple light sources 114. The driver 120 for the backlight adjusts the luminances of the light-emitting regions 110*s* according to backlight control data SG1 received from the controller 150.

Figure 4:
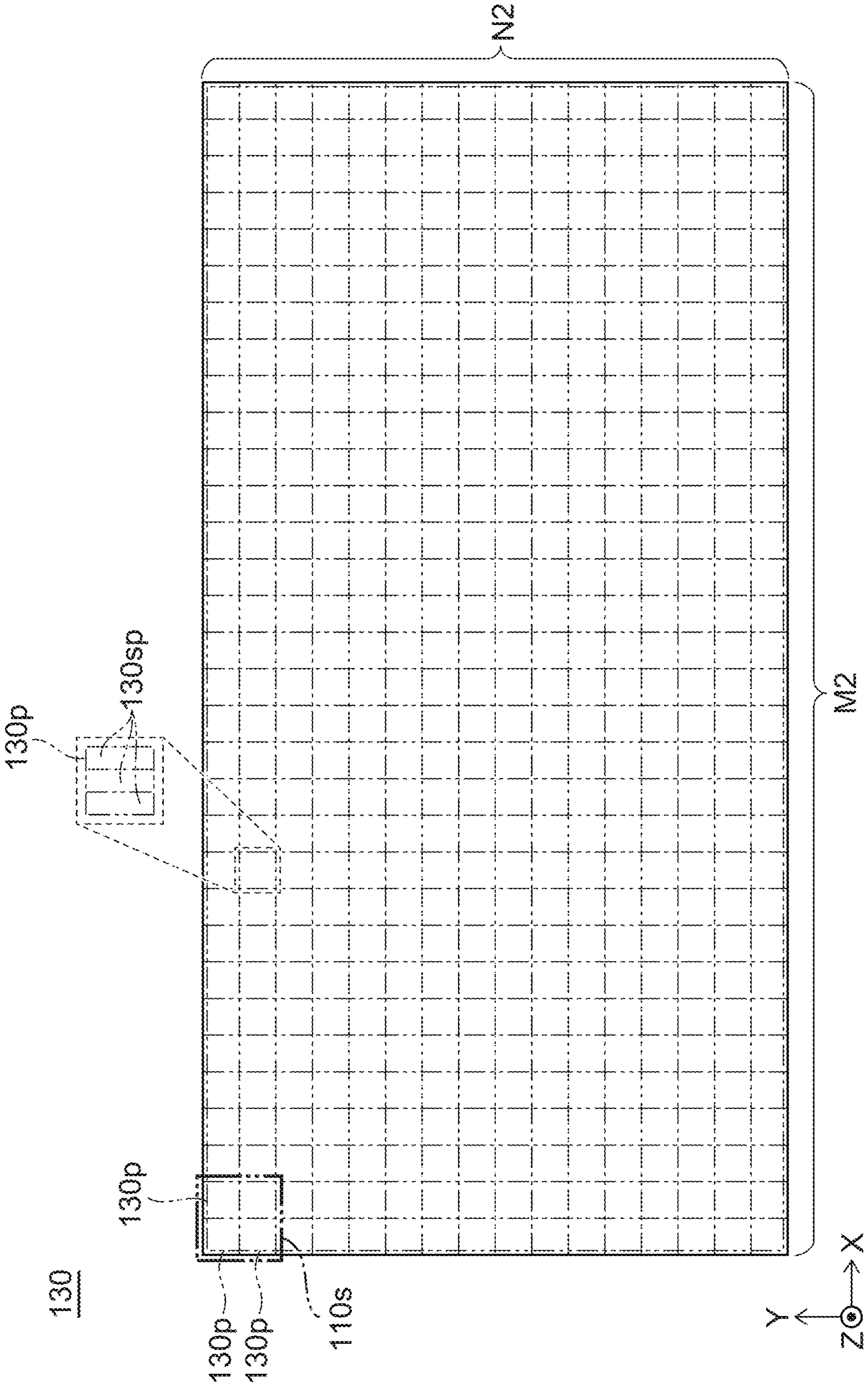
FIG. 4 illustrates a top view of a liquid crystal panel of the image display device according to the first embodiment.

FIG. 4 illustrates a top view of the liquid crystal panel 130 of the image display device 100 according to the first embodiment.

The liquid crystal panel 130 is located on the backlight 110. According to the present embodiment, the liquid crystal panel 130 is substantially rectangular in top-view. The liquid crystal panel 130 includes multiple pixels 130*p* arranged in a matrix configuration. In FIG. 4, one region that is surrounded with a double dot-dash line corresponds to one pixel 130*p*.

The liquid crystal panel 130 according to the present embodiment can display a color image. To achieve this objective, one pixel 130*p* includes three subpixels 130*sp* such that, for example, the white light emitted from the backlight 110 is transmitted to a subpixel that is configured to transmit blue light, a subpixel that is configured to transmit green light, and a subpixel that is configured to transmit red light. The light transmittances of the subpixels 130*sp* are individually controllable by the driver 140 for the liquid crystal panel. The gradations of the subpixels 130*sp* are individually controlled thereby.

The multiple pixels 130*p* are arranged in N2 rows and M2 columns. Here, N2 and M2 each are any integer such that N2>N1 and M2>M1. The multiple pixels 130*p* are located in the light-emitting regions 110*s* in top-view. Although an example is shown in FIG. 4 demonstrates that four pixels 130*p* correspond to one light-emitting region 110*s*, the number of the pixels 130*p* that correspond to one light-emitting region 110*s* may be less than four or more than four.

As shown in FIG. 1, the driver 140 for the liquid crystal panel is connected to the liquid crystal panel 130 and the controller 150. The driver 140 for the liquid crystal panel includes a drive circuit of the liquid crystal panel 130. The driver 140 for the liquid crystal panel adjusts gradations of the pixels 130*p* according to liquid crystal panel control data SG2 received from the controller 150.

Figure 5:
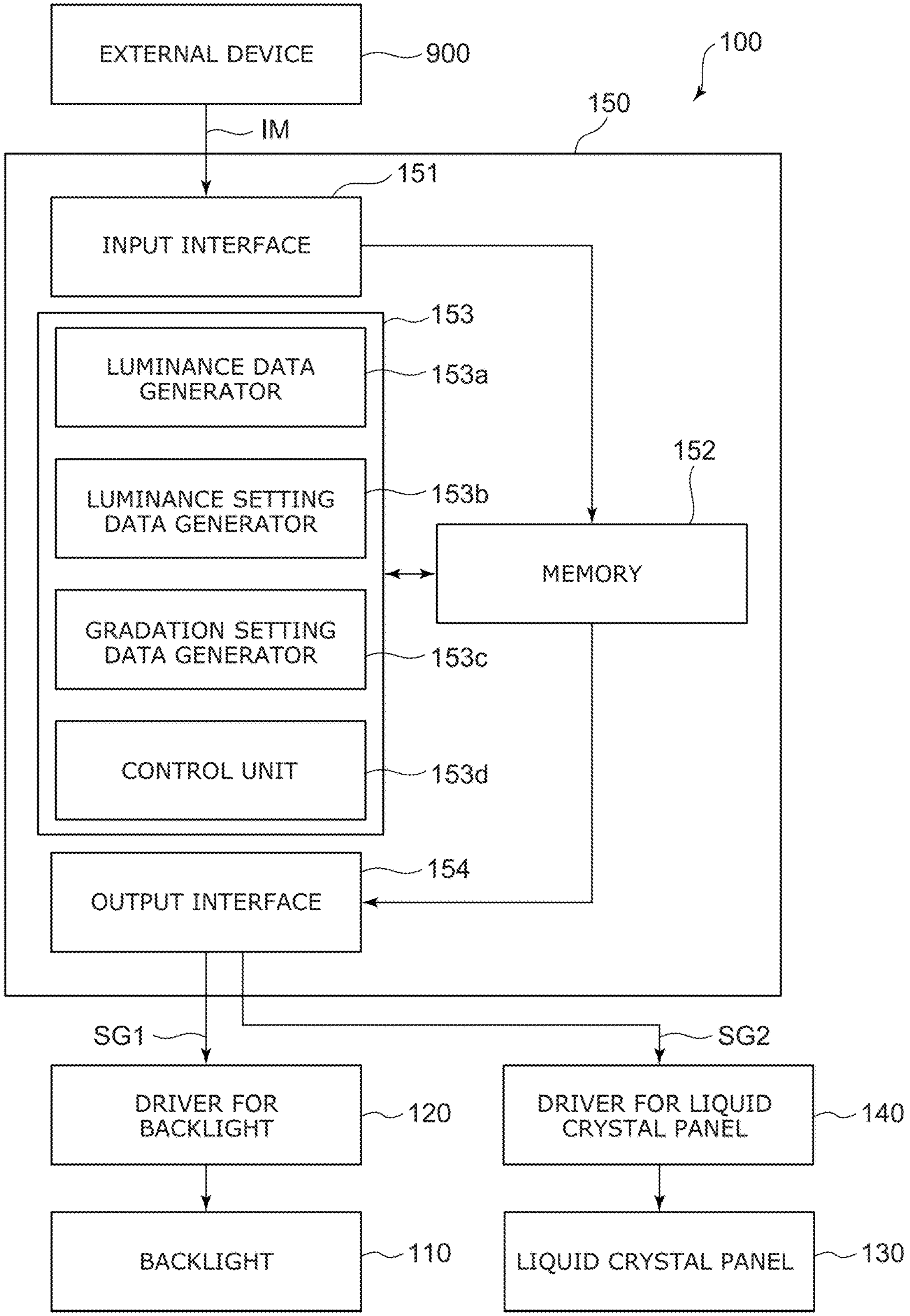
FIG. 5 is a block diagram showing components of the image display device according to the first embodiment.

FIG. 5 is a block diagram showing components of the image display device according to the first embodiment.

According to the first embodiment, the controller 150 includes an input interface 151, memory 152, a processor 153 such as a CPU (central processing unit) or the like, and an output interface 154. These components are connected to each other by a bus.

For example, the input interface 151 is connected to an external device 900 such as a tuner, a personal computer, a game machine, etc. The input interface 151 includes, for example, a connection terminal to the external device 900 such as a HDMI® (High-Definition Multimedia Interface) terminal, etc. The external device 900 inputs an input image IM to the controller 150 via the input interface 151.

The memory 152 includes, for example, ROM (Read-Only Memory), RAM (Random-Access Memory), etc. The memory 152 stores various programs, various parameters, and various data for displaying an image in the liquid crystal panel.

By reading the programs stored in the memory 152, the processor 153 processes the input image IM, determines setting values of luminances of the light-emitting regions 110*s* of the backlight 110 and setting values of the gradations of the pixels 130*p* of the liquid crystal panel 130, and controls the backlight 110 and the liquid crystal panel 130 based on these setting values. Thereby, an image that corresponds to the input image IM is displayed on the liquid crystal panel 130. The processor 153 includes a luminance data generator 153*a*, a luminance setting data generator 153*b*, a gradation setting data generator 153*c*, and a control unit 153*d*.

The output interface 154 is connected to the driver 120 for the backlight. Also, the output interface 154 includes, for example, a connection terminal of the driver 140 for the liquid crystal panel such as a HDMI® terminal, etc., and is connected to the driver 140 for the liquid crystal panel. The driver 120 for the backlight receives the backlight control data SG1 via the output interface 154. The driver 140 for the liquid crystal receives the liquid crystal panel control data SG2 via the output interface 154.

An image display method that uses the image display device 100 according to the present embodiment will be described hereinafter. Functions of the processor 153 as the luminance data generator 153*a*, the luminance setting data generator 153*b*, the gradation setting data generator 153*c*, and the control unit 153*d* also will be described.

Figure 6:
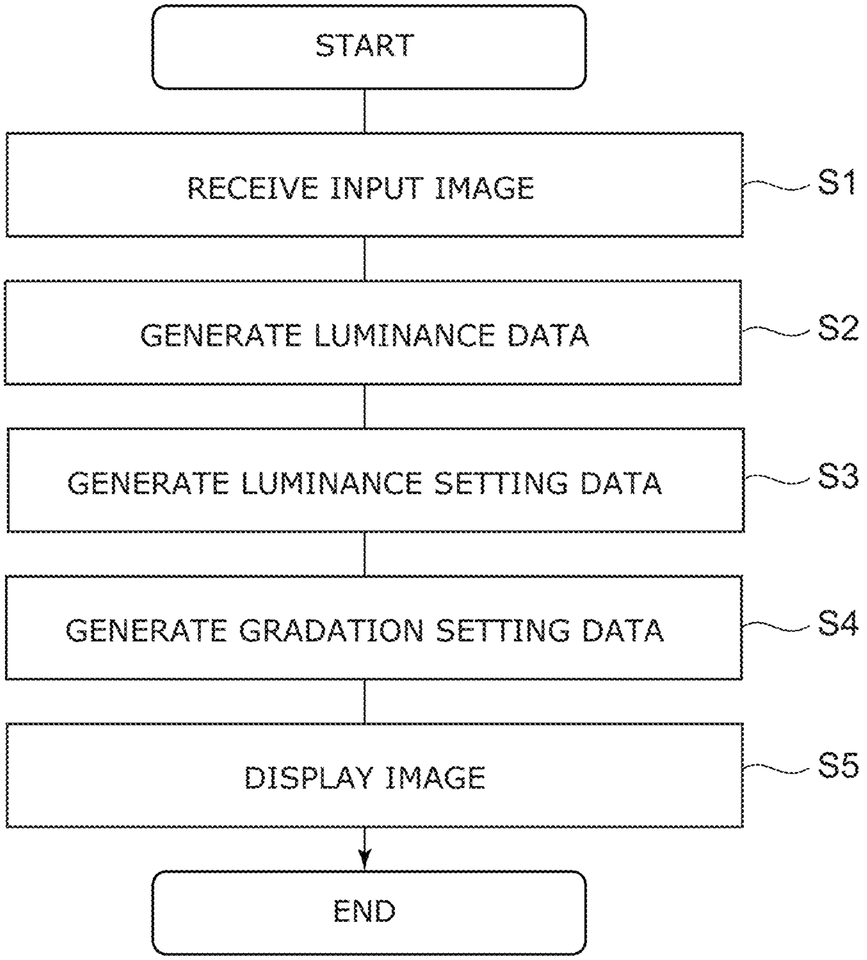
FIG. 6 is a flowchart showing an image display method according to the first embodiment.

FIG. 6 is a flowchart showing an image display method according to the first embodiment.

The image display method according to the first embodiment includes an acquisition process S1 of the input image IM, a generation process S2 of luminance data D1, a generation process S3 of luminance setting data D2, a generation process S4 of gradation setting data D3, and a display process S5 of the image on the liquid crystal panel 130. The processes will now be elaborated. A method of displaying an image corresponding to one input image IM on the liquid crystal panel 130 will be described. When the input images IM are sequentially input to the controller 150 and images that correspond to the input images IM are sequentially displayed on the liquid crystal panel 130, the following process S1 to S5 are repeatedly performed.

First, the acquisition process S1 of the input image IM will be described.

As shown in FIG. 5, the input interface 151 of the controller 150 receives the input image IM from the external device 900. The received input image IM is stored in the memory 152.

Figure 7:
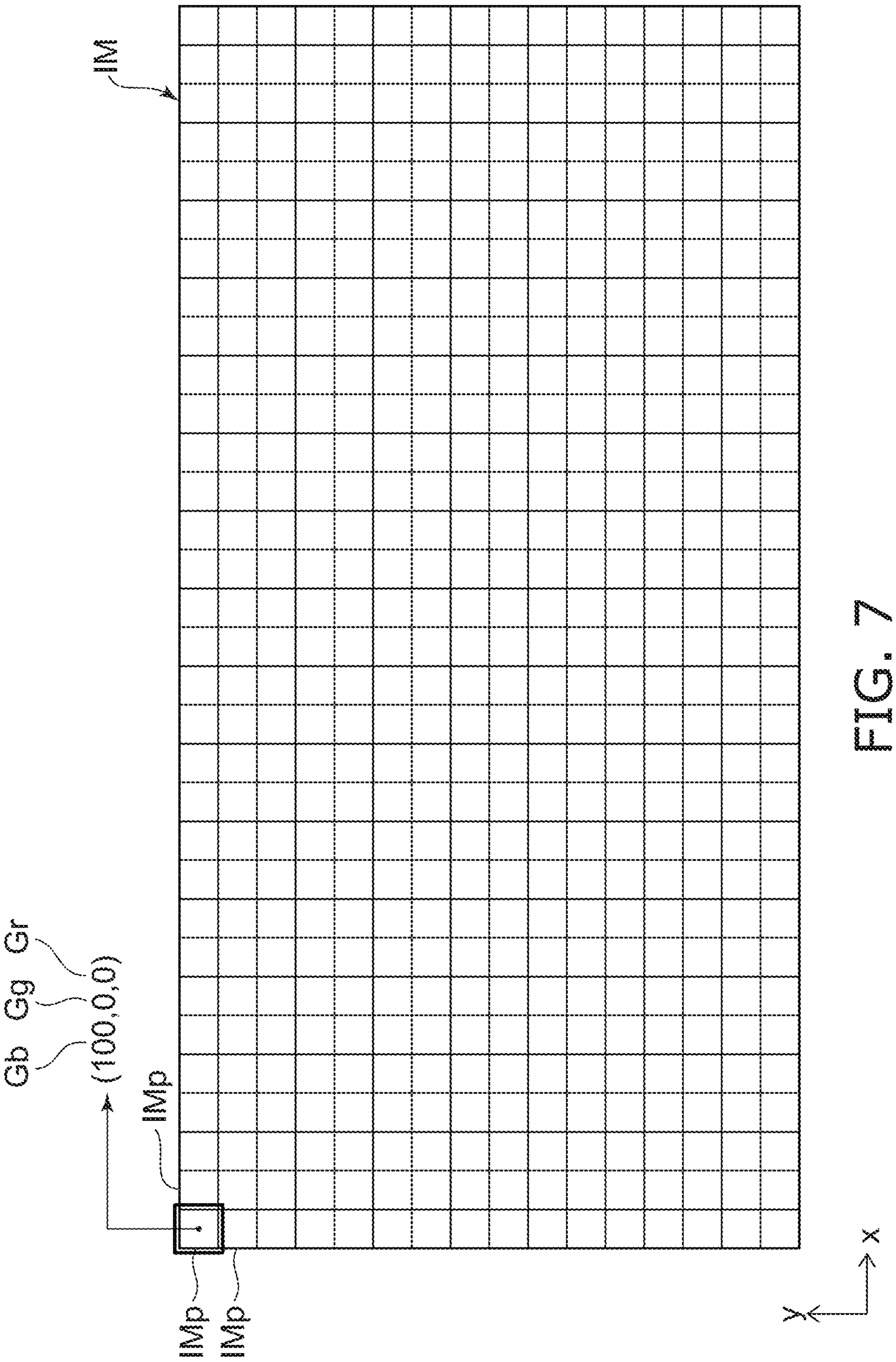
FIG. 7 is a schematic diagram showing an input image input to a controller of the image display device according to the first embodiment.

FIG. 7 is a schematic diagram showing an input image input to the controller 150 of the image display device 100 according to the first embodiment.

Figure 8:
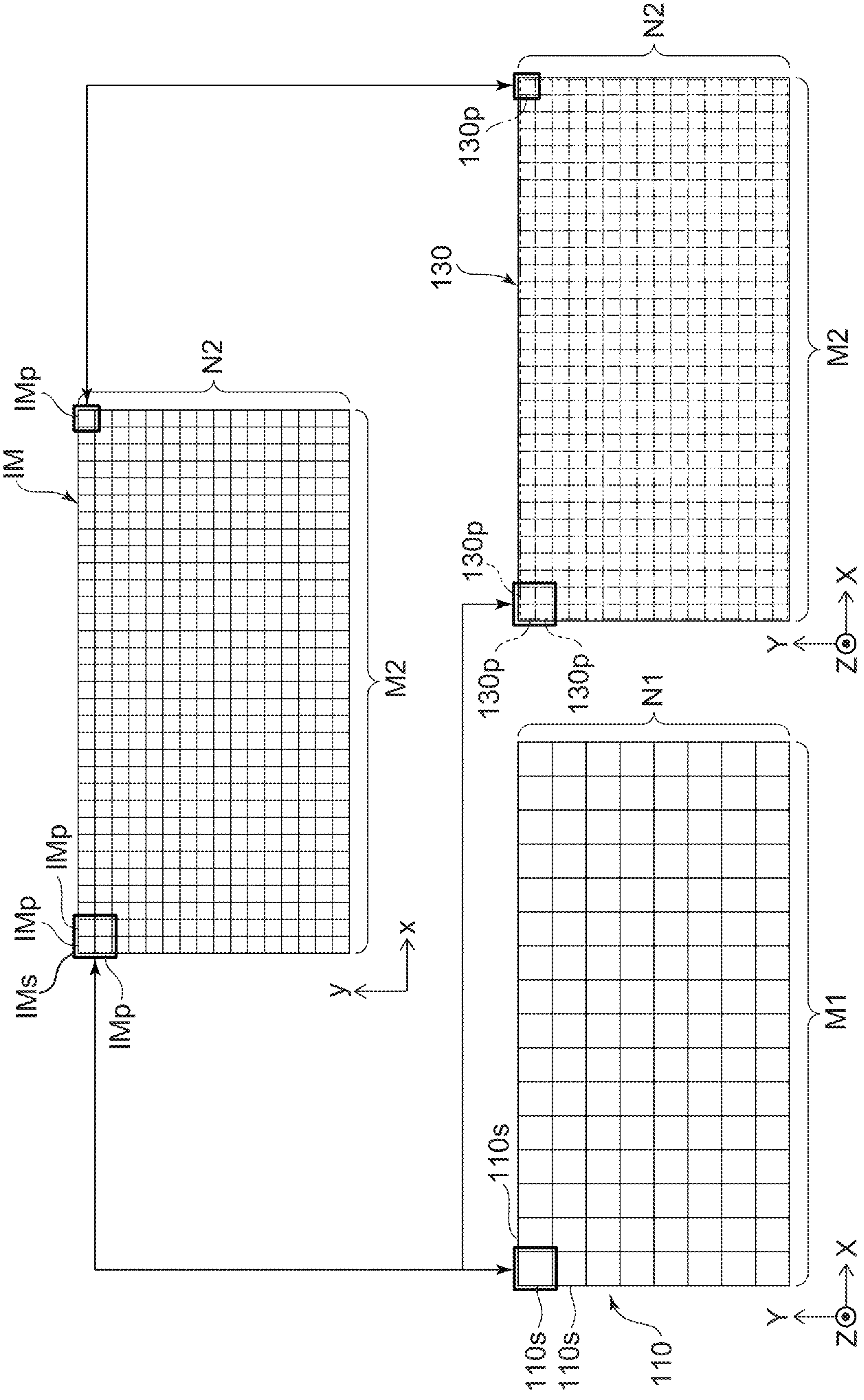
FIG. 8 is a schematic diagram showing a relationship among pixels of the liquid crystal panel, light-emitting regions of the backlight, and pixels of the input image in the first embodiment.

FIG. 8 is a schematic diagram showing a relationship among the pixels of the liquid crystal panel 130, the light-emitting regions of the backlight 110, and the pixels of the input image in the first embodiment.

The input image IM is data in which gradations are set for multiple pixels (may be referred to as "image pixels") IMp arranged in a matrix configuration. According to the first embodiment, the input image IM is a color image. To achieve this objective, a blue gradation Gb, a green gradation Gg, and a red gradation Gr are set for one pixel IMp. For example, the gradations Gb, Gg, and Gr are represented by numerals from 0 to 255.

For easier understanding of the following description, for example, the arrangement directions of the elements are represented using a xy orthogonal coordinate system for data in which elements such as the pixels IMp or the like are arranged in a matrix configuration as in the input image IM. The x-axis direction in the direction of the arrow is referred to as the "+x direction"; and the opposite direction is referred to as the "−x direction". Similarly, the y-axis direction in the direction of the arrow is referred to as the "+y direction"; and the opposite direction is referred to as the "−y direction". Also, hereinbelow, the element groups of the matrix that are arranged in the x-direction are called a "row"; and the element groups of the matrix that are arranged in the y-direction are called a "column". For example, as shown in FIG. 7, the row that is positioned furthest in the +y direction (the row positioned uppermost when viewed according to a direction of reference numerals) is referred to as the "first row"; and the row that is positioned furthest in the −y direction (the row positioned lowermost when viewed according to the direction of reference numerals) is referred to as the "final row". Similarly, as shown in FIG. 7, the column that is positioned furthest in the −x direction (the column positioned leftmost when viewed according to the direction of reference numerals) is referred to as the "first column"; and the column that is positioned furthest in the +x direction (the column positioned rightmost when viewed according to the direction of reference numerals) is referred to as the "final column".

For easier understanding of the following description, an example is described in which one pixel IMp of the input image IM corresponds to one pixel 130*p* of the liquid crystal panel 130 as shown in FIG. 8. In other words, according to the present embodiment, the multiple pixels IMp are arranged in N2 rows and M2 columns. Then, multiple pixels IMp are included in an area IMs of the input image IM that corresponds to one light-emitting region 110*s* of the backlight 110. However, the correspondence between the pixels of the input image and the pixels of the liquid crystal panel may not be one-to-one. In such a case, the processor 153 of the controller 150 performs the following processing after performing preprocessing of the input image so that the pixels of the input image and the pixels of the liquid crystal panel correspond one-to-one.

The generation process S2 of the luminance data D1 will now be described.

Figure 9:
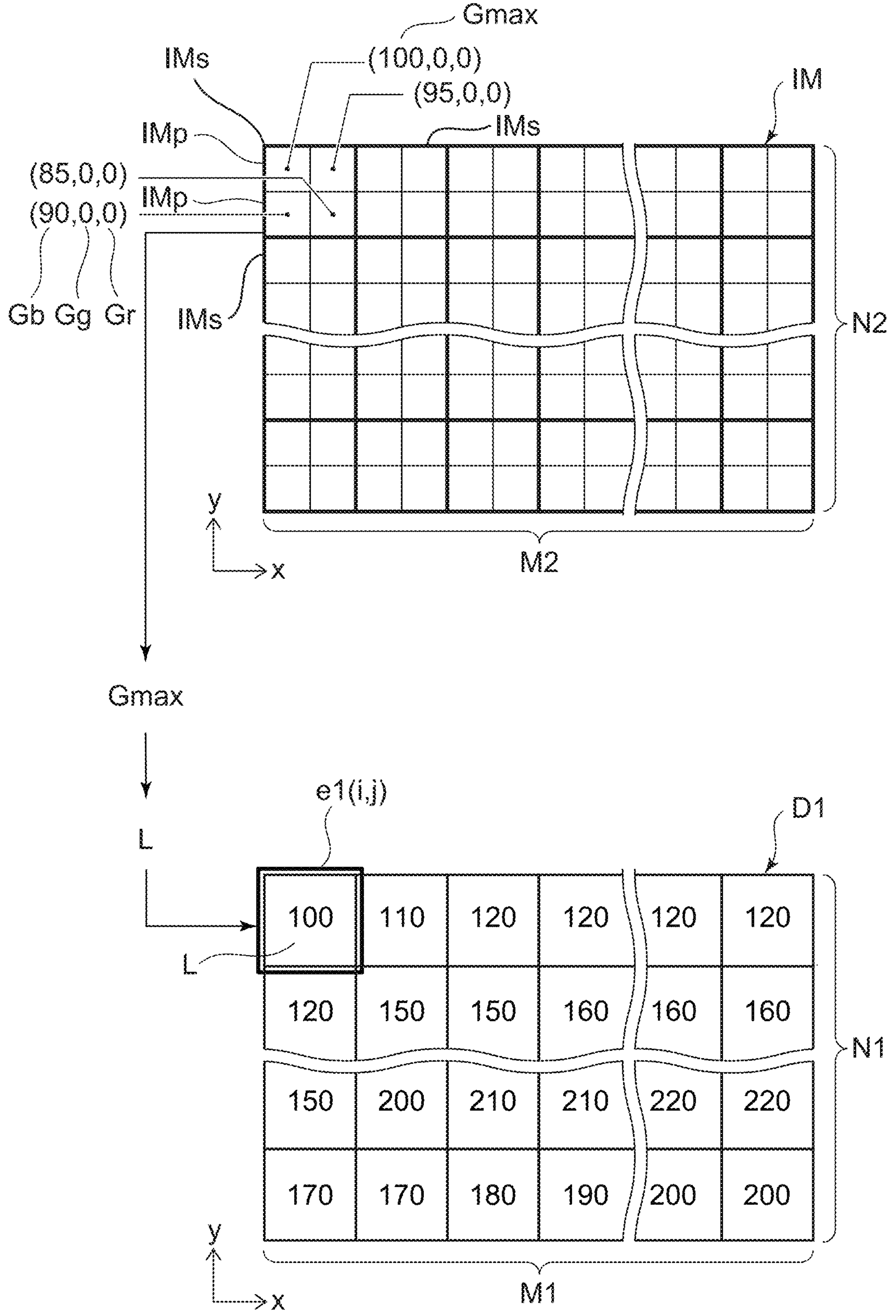
FIG. 9 is a schematic diagram showing a process of generating luminance data in the image display method according to the first embodiment.

FIG. 9 is a schematic diagram showing a process of generating luminance data in the image display method according to the first embodiment.

The luminance data generator 153*a* generates the luminance data D1 including a luminance L converted from a maximum gradation Gmax of the gradations Gb, Gg, and Gr of the multiple pixels IMp with respect to each area IMs of the input image IM corresponding to one light-emitting region 110*s*.

Specifically, first, the luminance data generator 153*a* determines an area IMs that corresponds to the light-emitting region 110*s* positioned at the ith row and the jth column. Then, the luminance data generator 153*a* uses the maximum value of the red gradation Gr, the green gradation Gg, or the blue gradation Gb of all pixels IMp included in the area IMs as the maximum gradation Gmax of the area IMs. Then, the luminance data generator 153*a* converts the maximum gradation Gmax into the luminance L. Then, the luminance data generator 153*a* uses the luminance L as a value of an element e1(*i, j*) at the ith row and the jth column of the luminance data D1. Here, i is any integer from 1 to N1, and j is any integer from 1 to M1.

The luminance data generator 153*a* performs this processing for all of the areas IMs.

The luminance data D1 thus obtained is data of a matrix configuration that includes N1 rows and M1 columns. The value of the element e1(*i, j*) of the luminance data D1 at the ith row and the jth column is the luminance L converted from the maximum gradation Gmax of the area IMs at the ith row and the jth column.

The luminance data generator 153*a* stores the luminance data D1 in the memory 152.

Figure 10:
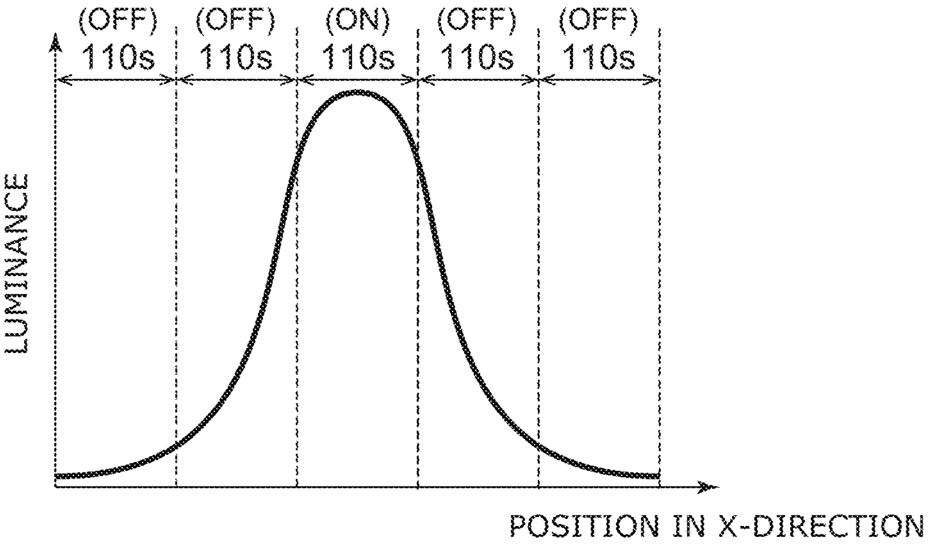
FIG. 10 is a graph showing a luminance distribution when a light source in one light-emitting region is lit in the backlight of the image display device according to the first embodiment.

FIG. 10 is a graph showing a luminance distribution when a light source in one light-emitting region is lit in the backlight of the image display device according to the first embodiment. In FIG. 10, the horizontal axis is the position in the X-direction, and the vertical axis is the luminance.

In FIG. 10, the light-emitting region 110*s* in which the light source 114 is lit is shown as ON, and the light-emitting regions 110*s* in which the light sources 114 are unlit are shown as OFF.

In the planar light source 111 according to the present embodiment, the adjacent light-emitting regions 110*s* are not perfectly shielded. Therefore, when the light source 114 in one light-emitting region 110*s* of the backlight 110 is lit, the light emitted from the light source 114 may propagate to neighboring light-emitting regions 110*s* at the periphery of the one light-emitting region 110*s*. For that reason, when the light source 114 in the one light-emitting region 110*s* is lit and the light sources 114 in the neighboring light-emitting regions 110*s* at the periphery of the one light-emitting region 110*s* are unlit, the luminances of the neighboring light-emitting regions 110*s* at the periphery are not perfectly zero. The leak of the light of the light source 114 in the brighter light-emitting regions 110*s* to the darker neighboring light-emitting regions 110*s* is highly noticeable as the luminance difference between the adjacent light-emitting regions 110*s* increases.

In a conventional image display device, the controller converts the luminance data D1 into backlight control data as-is, and controls the driver for the backlight based on the converted backlight control data. Because the luminance data D1 is determined solely according to the input image IM as is, the luminance difference between the adjacent light-emitting regions 110*s* may be large enough to cause high noticeability of a halo phenomenon depending on the input image IM. In contrast, the image display method according to the first embodiment can suppress the high noticeability of the halo phenomenon by performing the generation process S3 of the luminance setting data D2 that is described below.

The generation process S3 of the luminance setting data D2 will now be described.

FIGS. 11 to 14 are schematic diagrams showing a process of generating the luminance setting data in the image display method according to the first embodiment.

Figure 14:
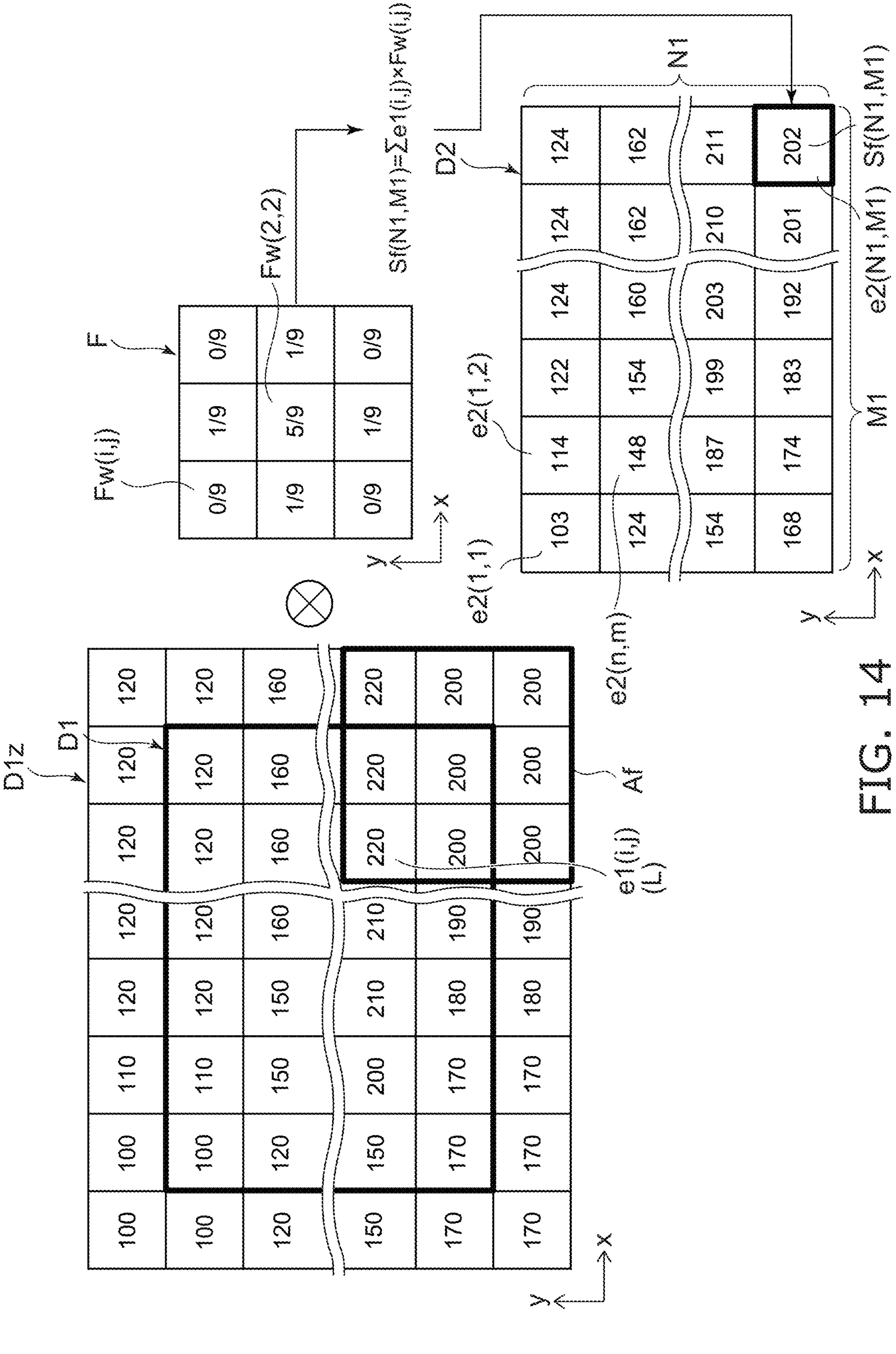

As shown in FIG. 14, the luminance setting data generator 153*b* generates the luminance setting data D2 including the setting values of the luminances of the light-emitting regions 110*s* by applying a spatial filter F to the luminance data D1 to reduce the luminance difference of the adjacent areas IMs.

The spatial filter F is prestored in the memory 152. According to the present embodiment, the spatial filter F includes multiple weighting factors Fw arranged in a matrix configuration. In an example shown in the present embodiment, the spatial filter F is a matrix of three rows and three columns. However, the number of rows and the number of columns of the spatial filter F are not limited to the aforementioned numbers. Hereinbelow, the weighting factor Fw at the ith row and the jth column also is called the weighting factor Fw(i, j). Here, i and j each are any integer from 1 to 3.

The value of the weighting factor Fw(2, 2) at the center of the spatial filter F is preferably greater than the values of the other weighting factors Fw. A Gaussian filter is shown as an example of the spatial filter F in FIGS. 12 to 14 in which the value of the weighting factor Fw(2, 2) at the center is greater than the values of the other weighting factors Fw. According to the present embodiment, the sum total of the weighting factors Fw is 1. However, the values of the weighting factors of the spatial filter are not particularly limited as long as the luminance difference between the adjacent areas can be reduced.

A specific example of the process of generating the luminance setting data D2 will now be described.

Figure 11:
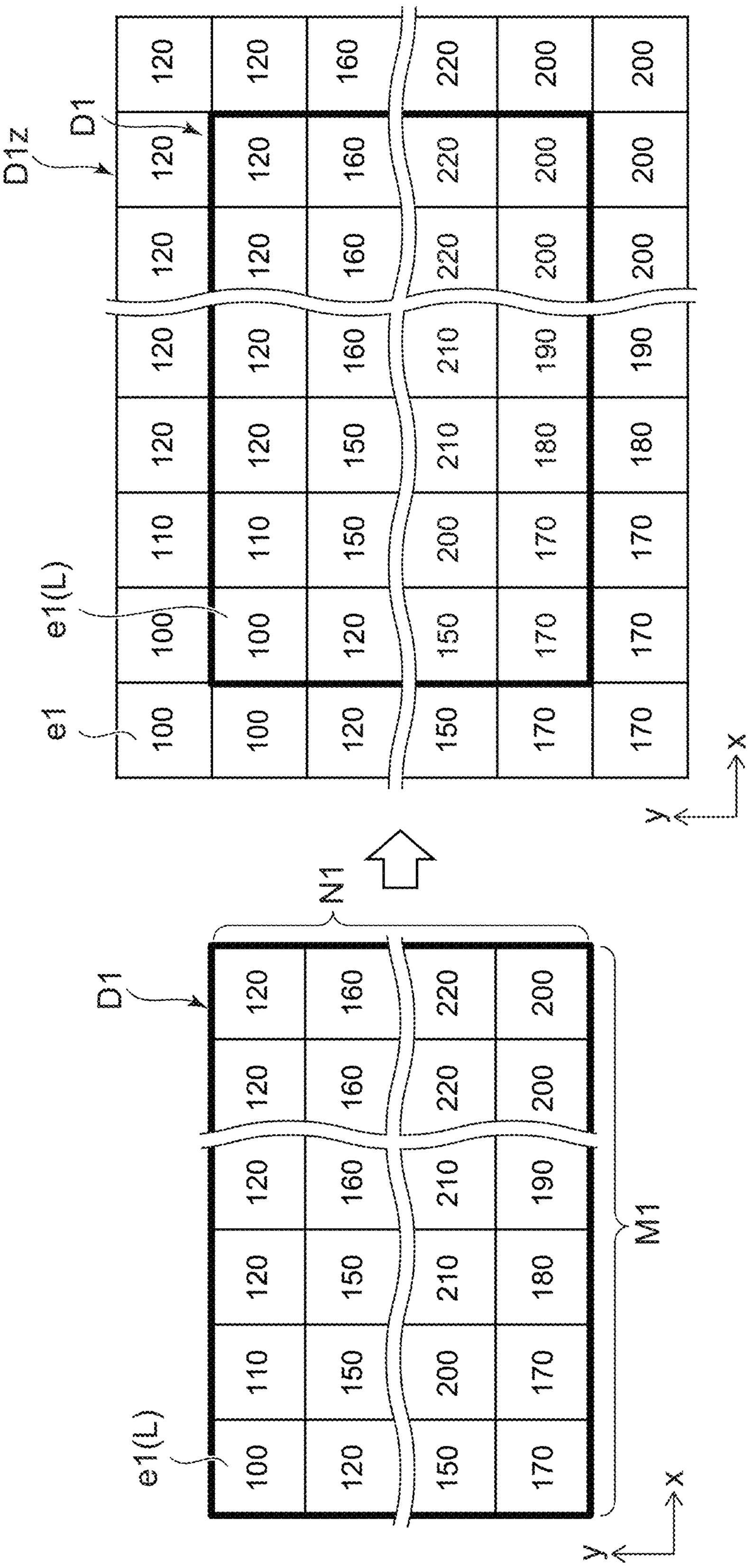
FIGS. 11-15 are schematic diagram showing processes of generating luminance setting data in the image display method according to the first embodiment.

First, as shown in FIG. 11, the luminance setting data generator 153*b* adds elements e1 at the periphery of the luminance data D1 so that the values of the added elements e1 are equal to the values of the adjacent elements. Thereby, the luminance data D1 is enlarged, and the number of rows of the luminance setting data D2 finally obtained can match the number of rows of the light-emitting regions 110*s* when applying the spatial filter F as described below as shown in FIG. 14. Similarly, the number of columns of the luminance setting data D2 finally obtained also can match the number of columns of the light-emitting regions 110*s*. Alternatively, the values of the elements added at the periphery of the luminance data may be 0 (zero). In other words, zero padding of the luminance data may be performed.

Hereinbelow, the data including the added elements e1 at the periphery of the luminance data D1 is called "enlarged luminance data D1*z*". Even if the added elements at the outer perimeter of the enlarged luminance data D1*z* have a value of 0, these elements also are called the "element e1".

Figure 12:
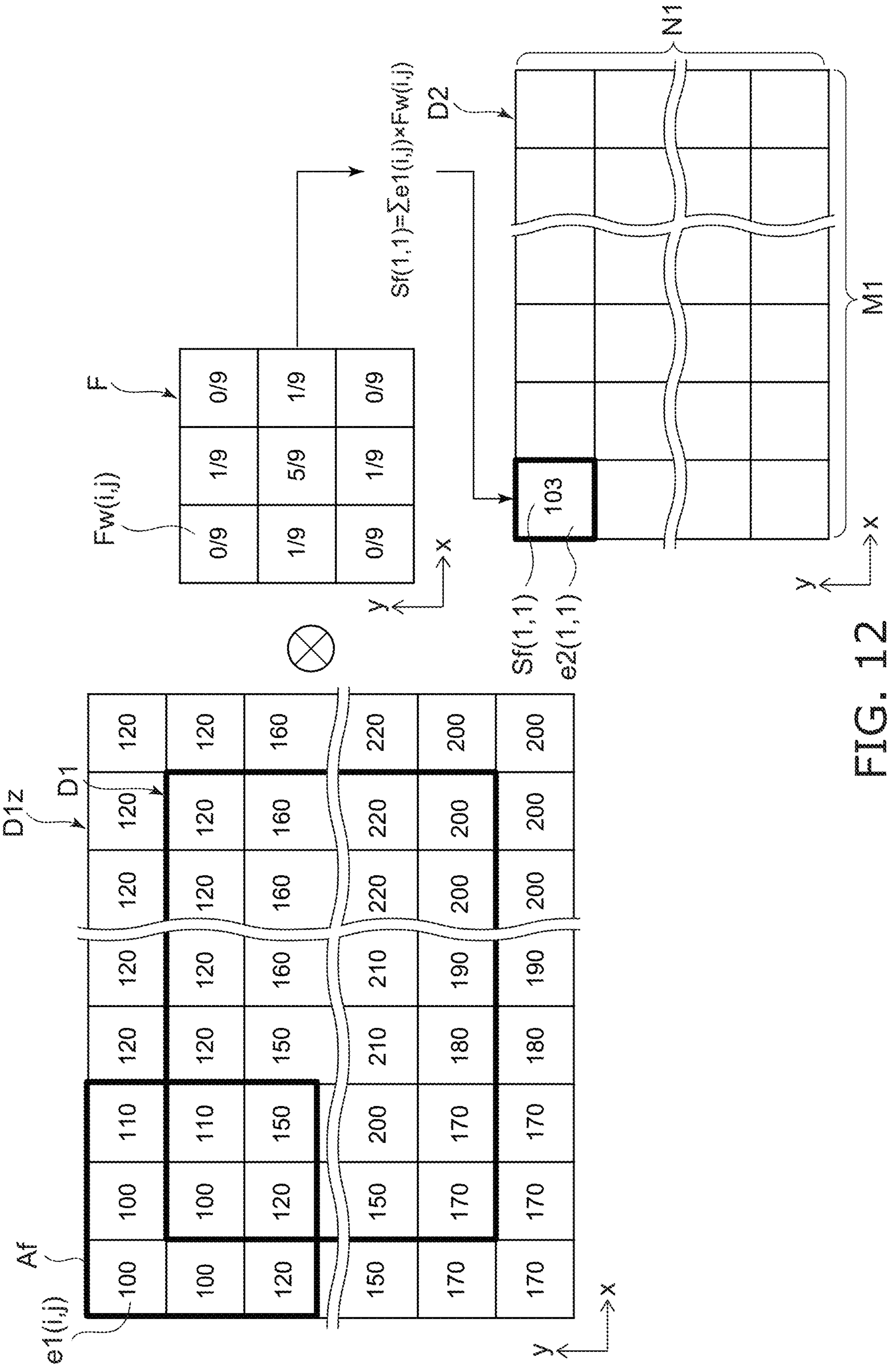

Then, as shown in FIG. 12, the luminance setting data generator 153*b* extracts a region Af that is furthest in the −x direction and furthest in the +y direction in the enlarged luminance data D1*z* and has the same size as the spatial filter F. Hereinbelow, the element e1 at the ith row and the jth column in this region Af also is called the element e1(*i, j*).

Next, the luminance setting data generator 153*b* calculates the product of e1(*i, j*)×Fw(i, j) by multiplying the element e1(*i, j*) at the ith row and the jth column in this region Af by the weighting factor Fw(i, j) at the ith row and the jth column of the spatial filter F. The element e1(*i, j*) is either an added element of which the value is the same value as the adjacent element, or an element of which the value is the luminance L calculated in the process S2. The luminance setting data generator 153*b* performs the calculation of the product of e1(*i, j*)×Wf(i, j) for all elements e1(*i, j*) included in this region Af.

Then, the luminance setting data generator 153*b* calculates a sum Sf(1, 1) by summing all of the products of e1(*i, j*)×Fw(i, j) calculated for one region Af. In this manner, for two matrixes such as the region Af and the spatial filter F, the products of the elements at the same positions (coordinates) are calculated, and the sum of the calculated products is called the "multiply-add operation".

Next, the luminance setting data generator 153*b* uses the sum Sf(1, 1) as the value of an element e2(1, 1) at the first row and the first column of the luminance setting data D2.

Figure 13:
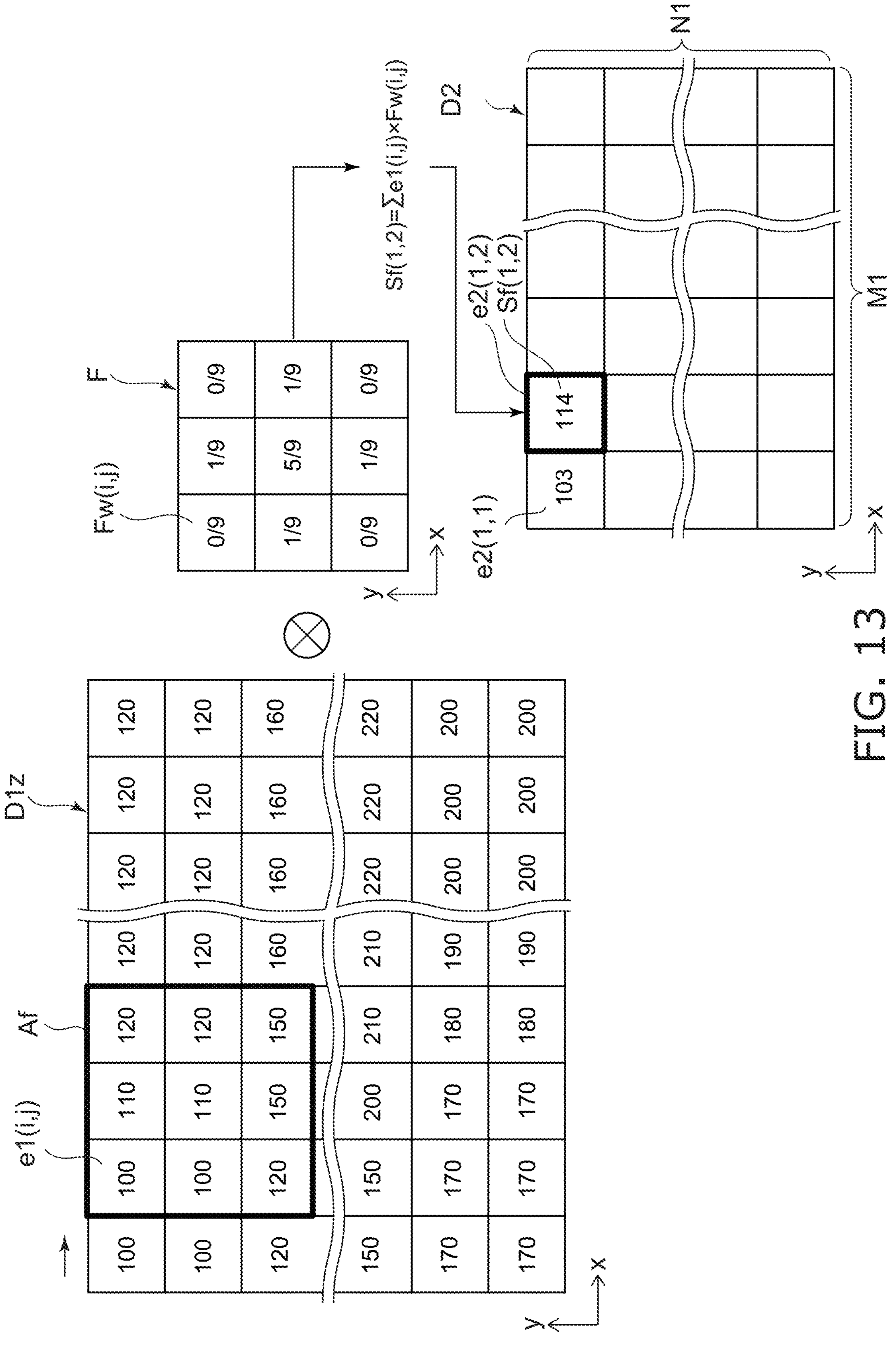

Then, as shown in FIG. 13, the luminance setting data generator 153*b* shifts the region Af one column in the +x direction in the enlarged luminance data D1*z*.

Next, the luminance setting data generator 153*b* performs the multiply-add operations of the element e1(*i, j*) and the weighting factor Fw(i, j) of the spatial filter F of this region Af. A sum Sf(1, 2) is calculated thereby.

Then, the luminance setting data generator 153*b* uses the sum Sf(1, 2) as the value of the element e2(1, 2) at the first row and the second column of the luminance setting data D2.

Next, the luminance setting data generator 153*b* shifts the region Af one column at a time in the +x direction, and performs the multiply-add operation for each shift. In this manner, the luminance setting data generator 153*b* sequentially shifts the region Af in the +x direction; and when the region Af is furthest in the +x direction, the luminance setting data generator 153*b* shifts the region Af one row in the −y direction so that the region Af is furthest in the −x direction. Then, the luminance setting data generator 153*b* performs the multiply-add operation. Then, the luminance setting data generator 153*b* again shifts the region Af one column at a time in the +x direction and performs the multiply-add operation for each shift. Thus, the luminance setting data generator 153*b* sequentially shifts the region Af in the x-direction and/or the y-direction and performs the multiply-add operation for each shift.

Finally, as shown in FIG. 14, the region Af is furthest in the +x direction and furthest in the −y direction in the enlarged luminance data D1*z*. Then, the luminance setting data generator 153*b* performs the multiply-add operation of the element e1(*i, j*) included in this region Af and the weighting factor Fw(i, j) of the spatial filter F. The sum Sf(N1, M1) is calculated thereby. Then, the luminance setting data generator 153*b* uses the sum Sf(N1, M1) as the value of the element e2(N1, M1) at the final row and the final column of the luminance setting data D2.

The luminance setting data D2 thus obtained is data of a matrix configuration of N1 rows and M1 columns. The value of each element e2(*n, m*) of the luminance setting data D2 at the nth row and the mth column corresponds to the setting value of the luminance of the light-emitting region 110*s* positioned at the nth row and the mth column. Here, n is any integer from 1 to N1, and m is any integer from 1 to M1.

The luminance setting data generator 153*b* stores the luminance setting data D2 in the memory 152.

As described above, the luminance setting data generator 153*b* performs the multiply-add operation of the multiple weighting factors Fw(i, j) of the spatial filter F and the multiple luminances L included in the region Af of the luminance data D1 to which the spatial filter F is applied while shifting the position of the region Af in the luminance data D1. As a result, the difference (the luminance difference) between the values of the adjacent elements e2 of the luminance setting data D2 can be less than the difference (the luminance difference) between the values of the adjacent elements e1 of the luminance data D1 that is calculated based on only the input image IM.

Although an example of the process of generating the luminance setting data D2 is described above, the process of generating the luminance setting data is not limited to that described above. In the above example, although the region Af is shifted in the −y direction after shifting the region Af all the way in the +x direction in the enlarged luminance data D1*z*, the shift technique of the regions to which the spatial filter is applied to the enlarged luminance data is not limited to the shift technique described above.

The generation process S4 of the gradation setting data D3 will now be described.

Figure 15:
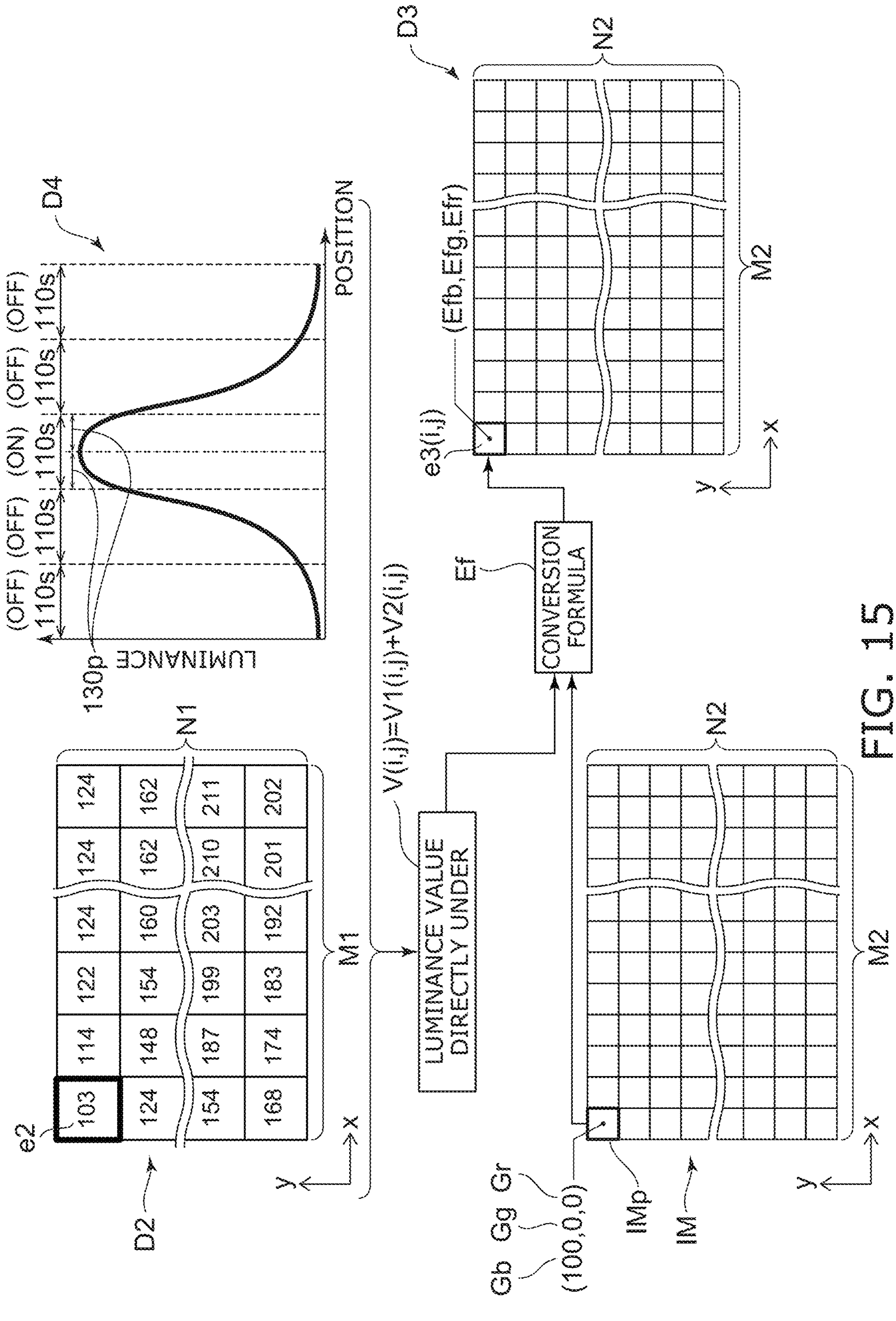

FIG. 15 is a schematic diagram showing a process of generating gradation setting data in the image display method according to the first embodiment.

The gradation setting data generator 153*c* generates the gradation setting data D3 including setting values of the gradations of the pixels 130*p* of the liquid crystal panel 130 based on the input image IM and the luminance setting data D2.

A specific example of the method for generating the gradation setting data D3 will now be described.

According to the present embodiment, the memory 152 pre-stores luminance distribution data D4 indicating luminance distribution in the XY plane when the light source 114 in one light-emitting region 110*s* is lit. Although the setting values of the luminances of the light-emitting regions 110*s* of the backlight 110 are determined in the process S3, actual luminance may be different depending on the position in the XY plane even in one light-emitting region 110*s* as shown in the luminance distribution data D4 of FIG. 15. Also, when the light source 114 in one light-emitting region 110*s* is lit, the light propagates to its neighboring light-emitting regions 110*s* at the periphery of the one light-emitting region 110*s* as described above.

To address such an issue, first, the gradation setting data generator 153*c* estimates a luminance value V(i, j) directly under the pixel 130*p* positioned at the ith row and the jth column of the liquid crystal panel 130 from the luminance setting data D2 and the luminance distribution data D4. Here, i is any integer from 1 to N2, and j is any integer from 1 to M2.

Specifically, the gradation setting data generator 153*c* estimates a luminance value V1(*i, j*) of the luminance setting data D2 directly under the pixel 130*p* when only the light source 114 in the light-emitting region 110*s* positioned directly under the pixel 130*p* is lit from the value of the element e2 (the setting value of the luminance) corresponding to the light-emitting region 110*s* and the luminance distribution data D4. Furthermore, the gradation setting data generator 153*c* estimates a luminance value V2(*i, j*) of the luminance setting data D2 directly under the pixel 130*p* when only the light sources 114 in the neighboring light-emitting regions 110*s* at the periphery are lit from the values of the elements e2 corresponding to the neighboring light-emitting regions 110*s* and the luminance distribution data D4. Then, the value of the sum of the luminance values V1(*i, j*) and V2(*i, j*) is estimated to be the luminance value V(i, j) directly under the pixel 130*p*. Thereby, the gradation setting data generator 153*c* can estimate the luminance value V(i, j) directly under the pixel 130*p* by including both the luminance distribution in the one light-emitting region 110*s* and the light leakage from the neighboring light-emitting regions 110*s*.

Then, the gradation setting data generator 153*c* inputs the estimated luminance value V(i, j) and the blue gradation Gb of the pixel IMp of the input image IM corresponding to the pixel 130*p*(i, j) into a conversion formula Ef. The conversion formula Ef is, for example, a conversion formula that converts the luminance into a gradation such as a gamma correction conversion formula, etc. The gradation setting data generator 153*c* uses an output value Efb of the conversion formula Ef generated by inputting the blue gradation Gb into the conversion formula Ef as the setting value of the blue gradation of the pixel 130*p*. Similar processing is performed also for the green gradation Gg; and an output value Efg of the conversion formula Ef obtained thereby is used as the setting value of the green gradation of the pixel 130*p*. The gradation setting data generator 153*c* performs similar processing also for the red gradation Gr; and an output value Efr of the conversion formula Ef obtained thereby is used as the setting value of the red gradation of the pixel 130*p*. The gradation setting data generator 153*c* uses the output values Efb, Efg, and Efr of the conversion formula Ef as the value of an element e3(*i, j*) at the ith row and the jth column of the gradation setting data D3.

The gradation setting data generator 153*c* performs this processing for each pixel 130*p* of the liquid crystal panel 130. The gradation setting data D3 is generated thereby.

The gradation setting data D3 thus obtained is data of a matrix configuration of N2 rows and M2 columns. The three values of Efb, Efg, and Egr of the element e3(*i, j*) at the ith row and the jth column of the gradation setting data D3 correspond respectively to the setting value of the blue gradation, the setting value of the green gradation, and the setting value of the red gradation of the pixel 130*p* positioned at the ith row and the jth column of the liquid crystal panel 130.

The gradation setting data generator 153*c* stores the gradation setting data D3 in the memory 152.

Although an example of the process of generating the gradation setting data D3 is described above, the process of generating the gradation setting data is not limited to that described above. For example, the luminance values may be input into the conversion formula after estimating the luminance values directly under all of the pixels of the liquid crystal panel.

The display process S5 of the image will now be described.

The control unit 153*d* causes the liquid crystal panel 130 to display the image by controlling the backlight 110 based on the luminance setting data D2 and by controlling the liquid crystal panel 130 based on the gradation setting data D3.

Specifically, as shown in FIG. 5, the control unit 153*d* transmits the backlight control data SG1 generated based on the luminance setting data D2 to the driver 120 for the backlight via the output interface 154. The backlight control data SG1 is, for example, data of a PWM (Pulse Width Modulation) format but is not particularly limited as long as the driver 120 for the backlight can operate based on the data. The driver 120 for the backlight controls the light emission of the light sources 114 based on the backlight control data SG1.

Also, the control unit 153*d* transmits the gradation setting data D3, which is the liquid crystal panel control data SG2 to the driver 140 for the liquid crystal panel via the output interface 154. Alternatively, the liquid crystal panel control data SG2 may be data converted from the gradation setting data D3 into a format that enables the driving of the driver 140 for the liquid crystal panel. The driver 140 for the liquid crystal panel controls the pixels 130*p*, and more specifically, light transmittances for the light of the subpixels 130*sp* based on the liquid crystal panel control data SG2.

The timing of converting the luminance setting data D2 into the backlight control data SG1 is not particularly limited as long as the timing is in or after the process S3. When converting the gradation setting data D3 into the liquid crystal panel control data SG2, the timing of the conversion is not particularly limited as long as the timing is in or after the process S4.

Effects of the first embodiment will now be described.

The image display method according to the first embodiment includes the process S2 of generating the luminance data D1, the process S3 of generating the luminance setting data D2, the process S4 of generating the gradation setting data D3, and the process S5 of displaying the image in the liquid crystal panel 130.

The backlight 110 includes the multiple light-emitting regions 110*s* arranged in a matrix configuration. The liquid crystal panel 130 includes the multiple pixels 130*p*. The input image IM is input to the controller 150 of the image display device 100. In the process S2, the luminance data D1 including the luminance L converted from the maximum gradation Gmax of an area IMs of the input image IM for each of the areas IMs corresponding to the light-emitting regions 110*s* of the backlight 110 is generated.

In the process S3, the luminance setting data D2 including the setting values of the luminances of the light-emitting regions 110*s* of the backlight 110 is generated by applying the spatial filter F to the luminance data D1 to reduce the luminance difference of the adjacent areas IMs.

In the process S4, the gradation setting data D3 including the setting values of the gradations of the pixels 130*p* of the liquid crystal panel 130 is generated based on the luminance setting data D2 and the input image IM.

In the process S5, the image is displayed on the liquid crystal panel 130 by controlling the backlight 110 based on the luminance setting data D2 and by controlling the liquid crystal panel 130 based on the gradation setting data D3.

In such a manner, in the image display method according to the first embodiment, the luminance setting data D2 is generated by applying the spatial filter F to the luminance data D1 to reduce the luminance difference of the adjacent areas IMs. As a result, according to the first embodiment, compared to the case where the backlight 110 is controlled based on the luminance data D1 as is, the difference between the setting values of the luminances of the adjacent light-emitting regions 110*s* of the backlight can be reduced. As a result, the halo phenomenon can be suppressed.

According to the first embodiment, the spatial filter F includes the multiple weighting factors Fw. In the process S3 of generating the luminance setting data D2, the multiply-add operation of the multiple luminances L included in the region Af of the luminance data D1 to which the spatial filter F is applied and the multiple weighting factors Fw of the spatial filter F is performed while shifting the position of the region Af in the luminance data D1. As a result, the luminance difference between the adjacent light-emitting regions 110*s* of the backlight 110 can be reduced by including the maximum gradation Gmax of areas IMs of the input image IM and the maximum gradation Gmax of its neighboring areas IMs. The luminance difference between the adjacent light-emitting regions 110*s* of the backlight 110 can be reduced by a simple method that uses the spatial filter F.

Among the multiple weighting factors Fw, the value of the weighting factor Fw(2, 2) at the center of the spatial filter F is greater than the values of the other weighting factors Fw. A large difference between the value of the element e2 of the luminance setting data D2 and the luminance L converted from the maximum gradation Gmax of areas IMs of the input image IM can be suppressed thereby.

The image display device 100 according to the first embodiment includes: the backlight 110 including the planar light source 111 that includes the multiple light-emitting regions 110*s* arranged in a matrix configuration and includes the light sources 114 located in the multiple light-emitting regions 110*s*; the liquid crystal panel 130 that is positioned on the backlight 110 and includes the multiple pixels 130*p*; and the controller 150 controlling the backlight 110 and the liquid crystal panel 130. The controller 150 includes the luminance data generator 153*a*, the luminance setting data generator 153*b*, the gradation setting data generator 153*c*, and the control unit 153*d*.

The luminance data generator 153*a* generates the luminance data D1 in which the maximum gradation Gmax of an area IMs of the input image IM is converted into the luminance L for each area IMs corresponding to the light-emitting regions 110*s* of the backlight 110.

The luminance setting data generator 153*b* generates the luminance setting data D2 including the setting values of the luminances of the light-emitting regions 110*s* of the backlight 110 by applying the spatial filter F to the luminance data D1 to reduce the luminance difference of the adjacent areas IMs.

The gradation setting data generator 153*c* generates the gradation setting data D3 including the setting values of the gradations of the pixels 130*p* of the liquid crystal panel 130 based on the luminance setting data D2 and the input image IM.

The control unit 153*d* causes the liquid crystal panel 130 to display the image by controlling the backlight 110 based on the luminance setting data D2 and by controlling the liquid crystal panel 130 based on the gradation setting data D3.

In such a manner, in the image display device 100 according to the first embodiment, the luminance setting data D2 is generated by applying the spatial filter F to the luminance data D1 to reduce the luminance difference of the adjacent areas IMs. As a result, the luminance difference of the adjacent areas IMs can be reduced compared to the case where the backlight 110 is controlled based on the luminance data D1 as is. As a result, the halo phenomenon can be suppressed.

Figure 16A:
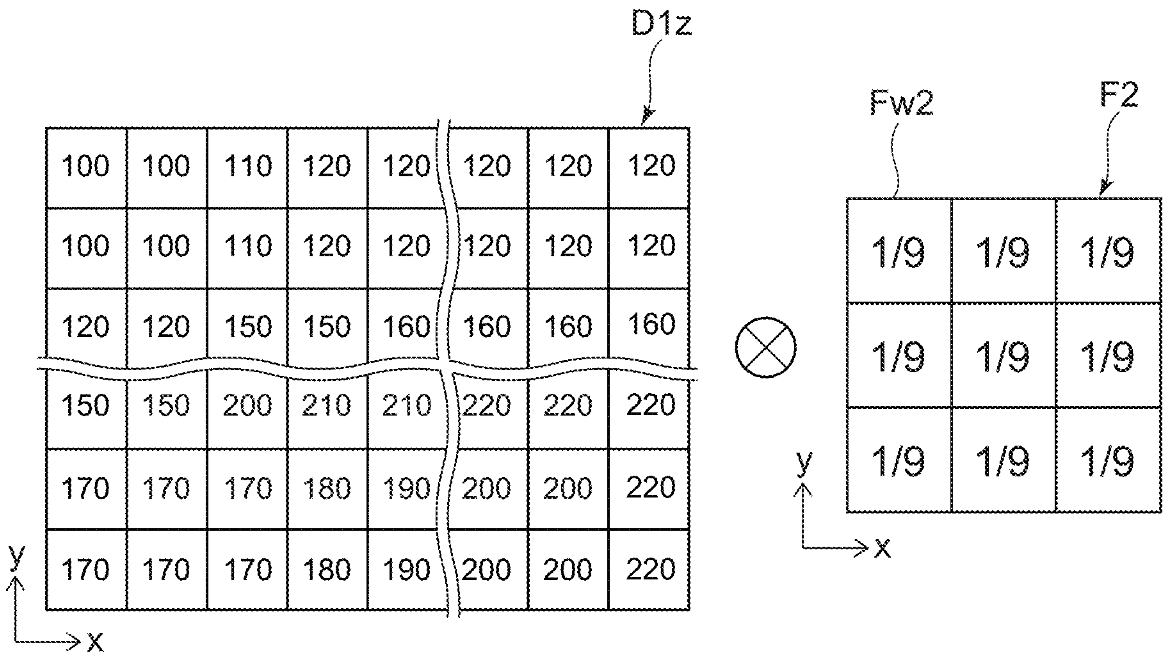
FIG. 16A is a schematic diagram showing another example of a spatial filter.
Figure 16B:
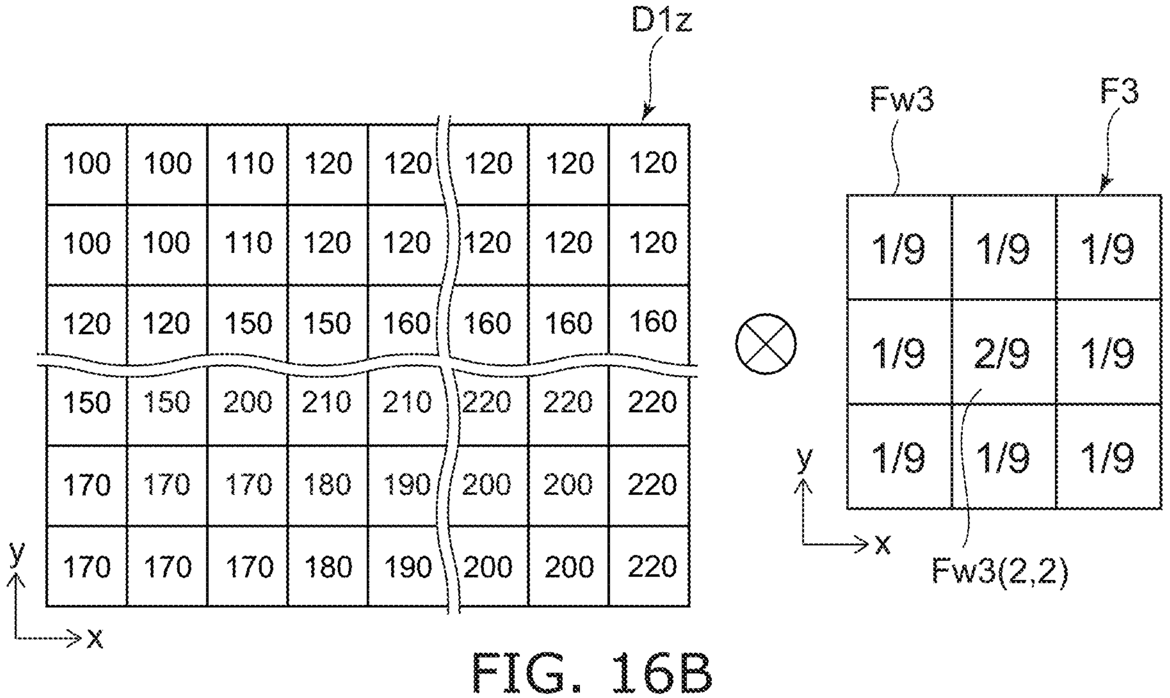
FIG. 16B is a schematic diagram showing another example of a spatial filter.

FIGS. 16A and 16B are schematic diagrams showing other examples of the spatial filter.

As shown in FIG. 16A, a spatial filter F2 may be an averaging filter in which the values of all of weighting factors Fw2 are the same. Also, as shown in FIG. 16B, a spatial filter F3 may be a median filter in which a weighting factor Fw3(2, 2) at the center is greater than the other weighting factors Fw3, and the values of the other weighting factors Fw3 are the same. Also, the spatial filter may not be a known filter such as a Gaussian filter, an averaging filter, a median filter, etc.

Second Embodiment

A second embodiment will now be described.

Figure 17:
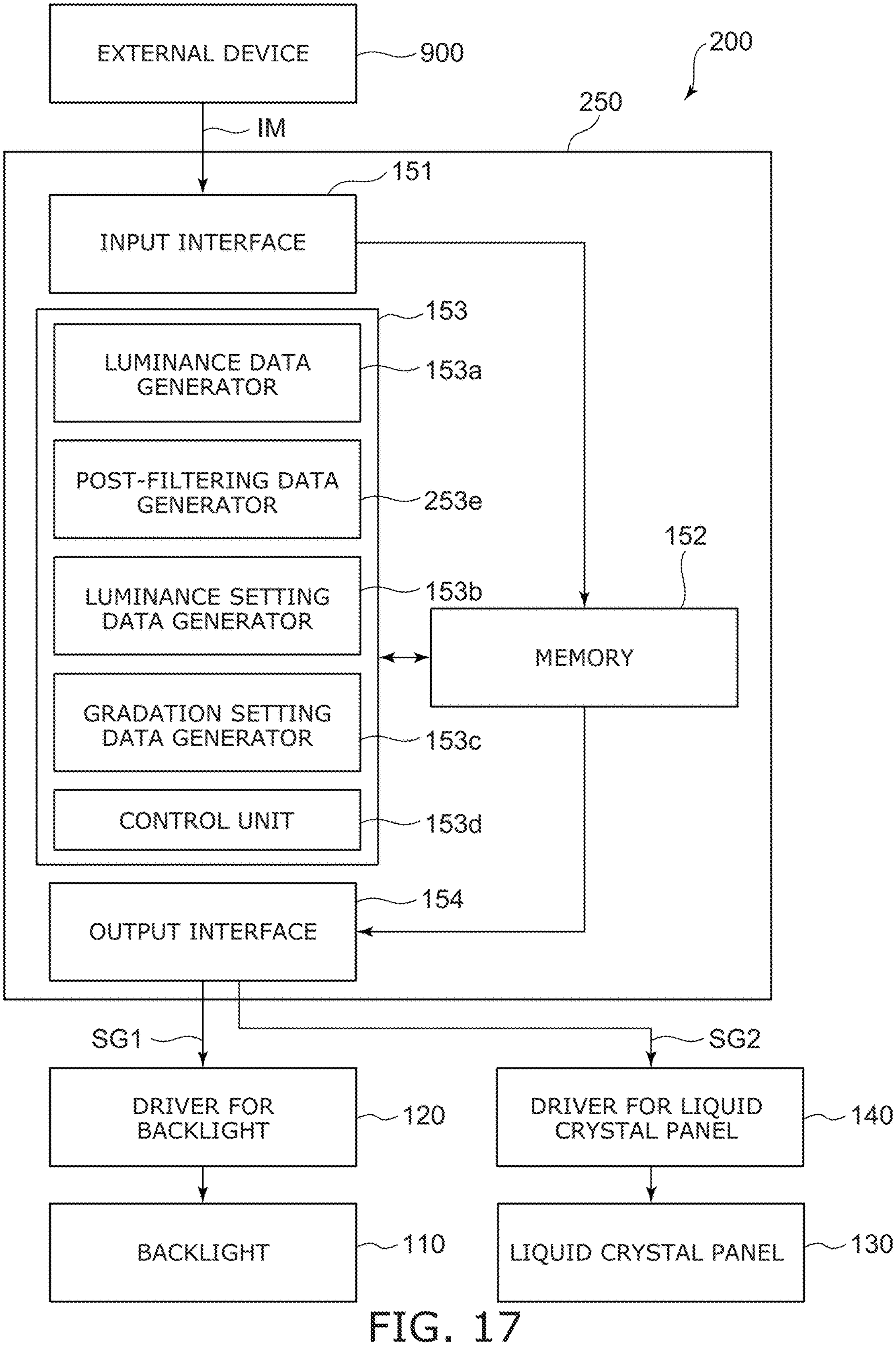
FIG. 17 is a block diagram showing components of an image display device according to a second embodiment.

FIG. 17 is a block diagram showing components of an image display device according to the second embodiment.

Figure 18:
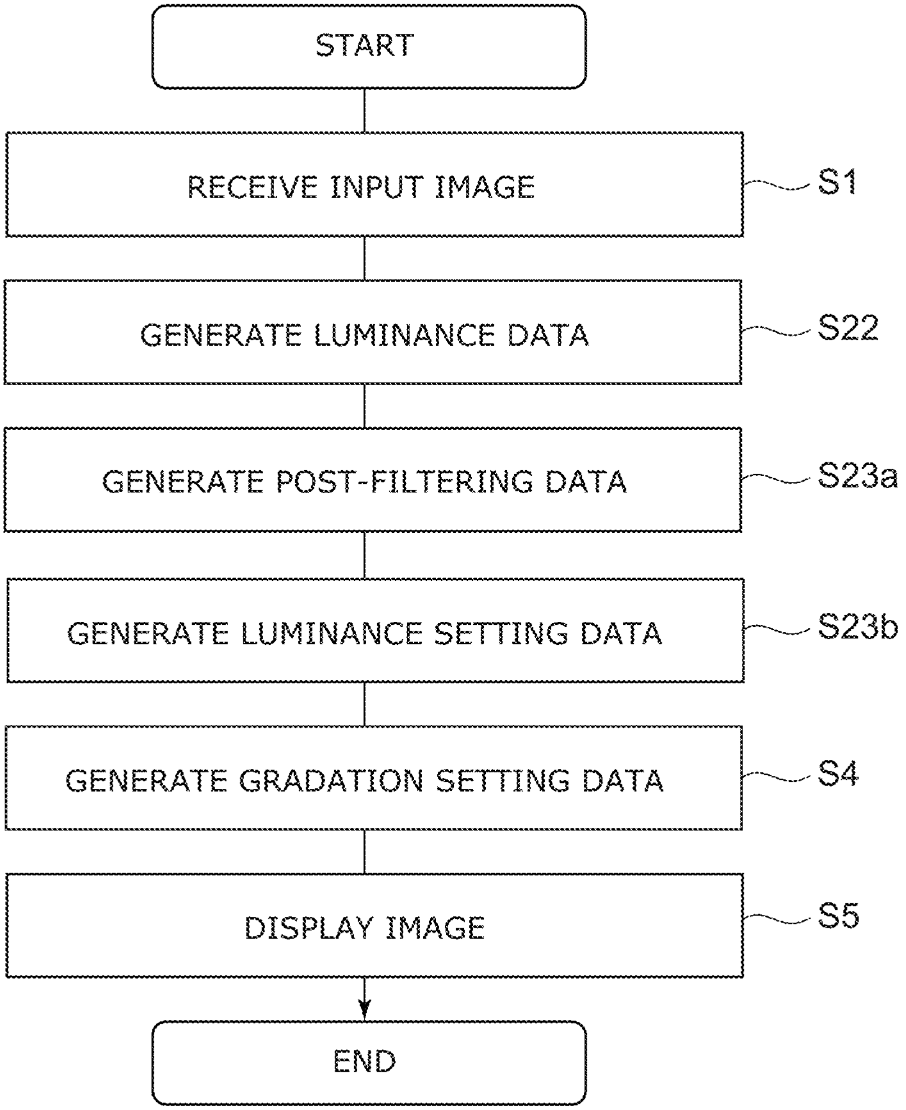
FIG. 18 is a flowchart showing an image display method according to the second embodiment.

FIG. 18 is a flowchart showing an image display method according to the second embodiment.

The second embodiment differs from the first embodiment in that a controller 250 of the image display device 200 further includes a post-filtering data generator 253*e*, and in that a generation process S22 of luminance data D21, a generation process S23*a* of post-filtering data D22*a*, and a generation process S23*b* of luminance setting data D22*b* in the image display method are different.

As a general rule in the following description, only the differences from the first embodiment are described. Other than the items described below, the second embodiment is similar to the first embodiment.

Figure 19A:
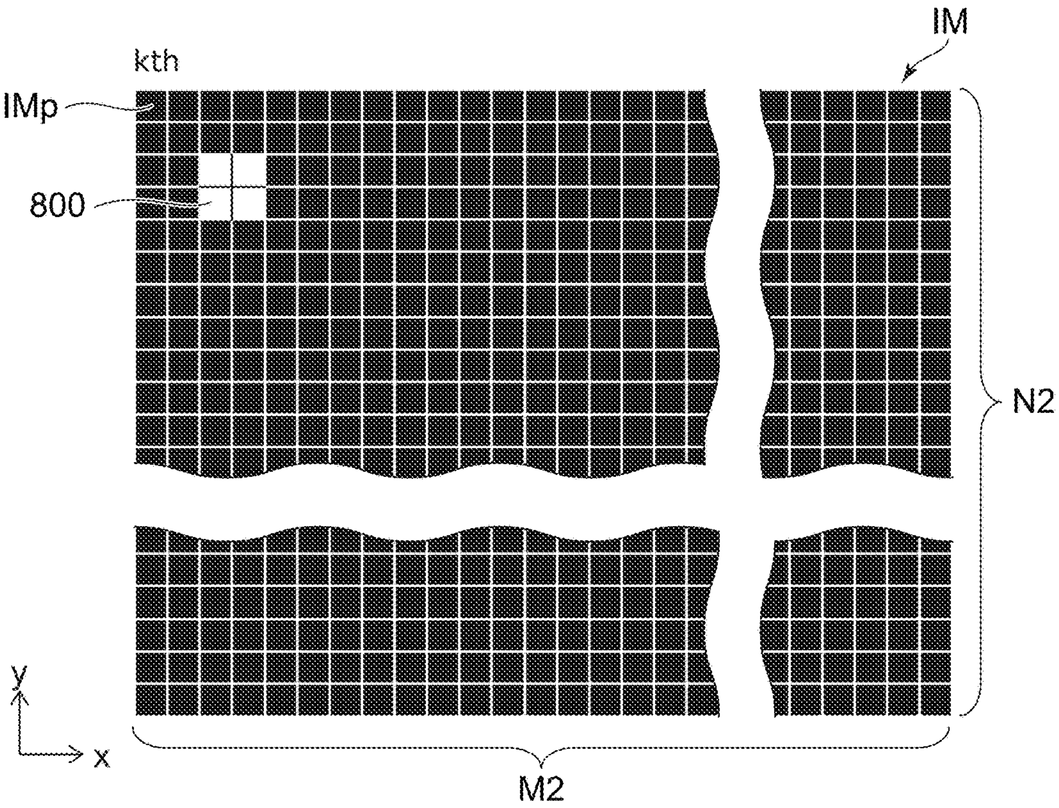
FIG. 19A is a schematic diagram showing the kth input image.

FIG. 19A is a schematic diagram showing the kth input image.

Figure 19B:
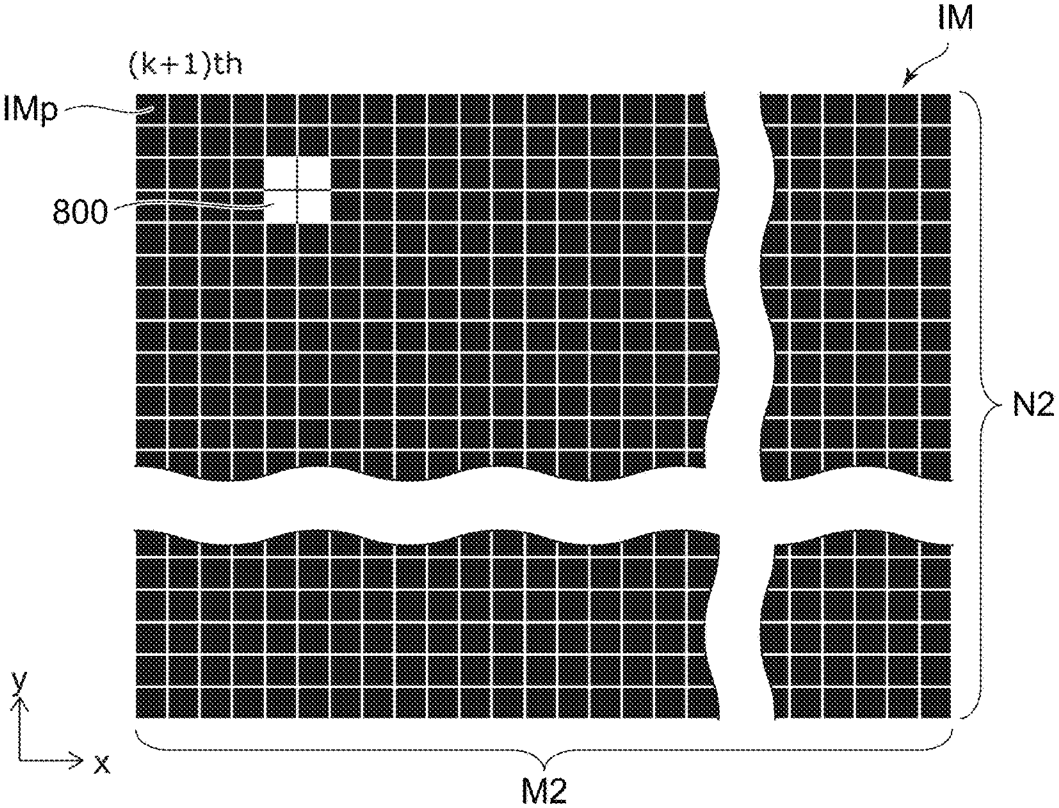
FIG. 19B is a schematic diagram showing the (k+1)th input image.

FIG. 19B is a schematic diagram showing the (k+1)th input image.

According to the second embodiment, the kth input image IM is an image in which the pixel IMp at the third row and the third column, the pixel IMp at the third row and the fourth column, the pixel IMp at the fourth row and the third column, and the pixel IMp at the fourth row and the fourth column are bright, and the other pixels IMp are dark. The (k+1)th input image IM is an image in which the pixel IMp at the third row and the fifth column, the pixel IMp at the third row and the sixth column, the pixel IMp at the fourth row and the fifth column, and the pixel IMp at the fourth row and the sixth column are bright, and the other pixels IMp are dark. In other words, a rectangular bright region 800 moves two columns in the +x direction when the kth input image IM is switched to the (k+1)th input image IM.

First, a processing method of the kth input image IM will now be described.

Figure 20:
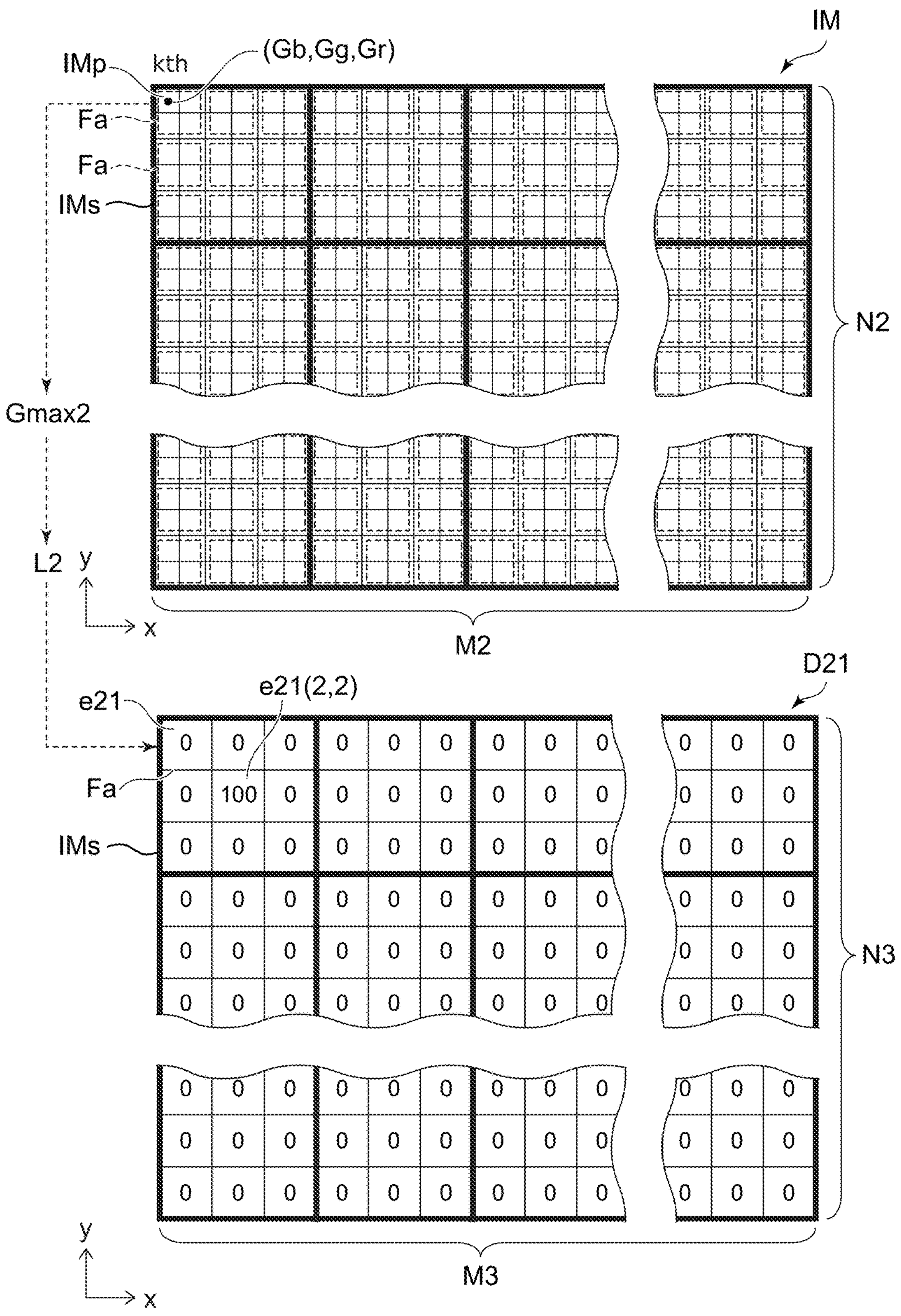
FIG. 20 is a schematic diagram showing a process of generating the kth luminance data in the image display method according to the second embodiment.

FIG. 20 is a schematic diagram showing a process of generating the kth luminance data in the image display method according to the second embodiment.

In the generation process S22 of the luminance data D21, first, the luminance data generator 153*a* divides each area IMs of the kth input image IM into multiple filter application areas (may be referred to as “sub-divided areas”) Fa, in which multiple areas Ims correspond to one light-emitting region 110*s*. Multiple pixels Imp are included in each filter application area Fa. In FIG. 20, one region surrounded with a thick solid line is one area Ims; one region surrounded with a broken line is one filter application area Fa; and one region surrounded with a fine solid line is one pixel Imp.

In FIG. 20, each area Ims is divided into nine filter application areas Fa in three rows and three columns. Each filter application area Fa includes four pixels Imp. However, the number of filter application areas included in each area and the number of pixels included in each filter application area are not limited to those described above.

The luminance data generator 153*a* generates the luminance data D21 including a luminance L2 converted from a maximum gradation Gmax2 of the gradations Gb, Gg, and Gr of all pixels Imp included in each filter application area Fa of the kth input image IM.

When the multiple filter application areas Fa are arranged in N3 rows and M3 columns in the input image IM, the kth luminance data D21 has a matrix configuration of N3 rows and M3 columns. Here, N3 is any integer that is greater than N1, i.e., the number of rows of the light-emitting regions 110*s* or the areas Ims, and less than N2, i.e., the number of rows of the pixels Imp of the input image IM; and M3 is any integer that is greater than M1, i.e., the number of columns of the light-emitting regions 110*s* or the areas Ims, and less than M2, i.e., the number of columns of the pixels Imp of the input image IM.

Hereinbelow, an element e21 at the ith row and the jth column of the luminance data D21 also is called the element e21(*i, j*). The elements e21 correspond to the filter application areas Fa. Accordingly, i is any integer that is not less than 1 and not more than N3; and j is any integer that is not less than 1 and not more than M3.

As described above, the kth input image IM is an image including bright pixels Imp at the third row and the third column, the third row and the fourth column, the fourth row and the third column, and the fourth row and the fourth column, and the other dark pixels Imp. In the following description, the value of the element e21(2, 2) at the second row and the second column is assumed to be a value that is greater than 0 (e.g., described below as 100 in the embodiment); and the values of the other elements e21(*i, j*) are assumed to be 0.

The luminance data generator 153*a* stores the luminance data D21 in the memory 152.

The generation process S23*a* of the kth post-filtering data D22*a* will now be described.

Figure 21:
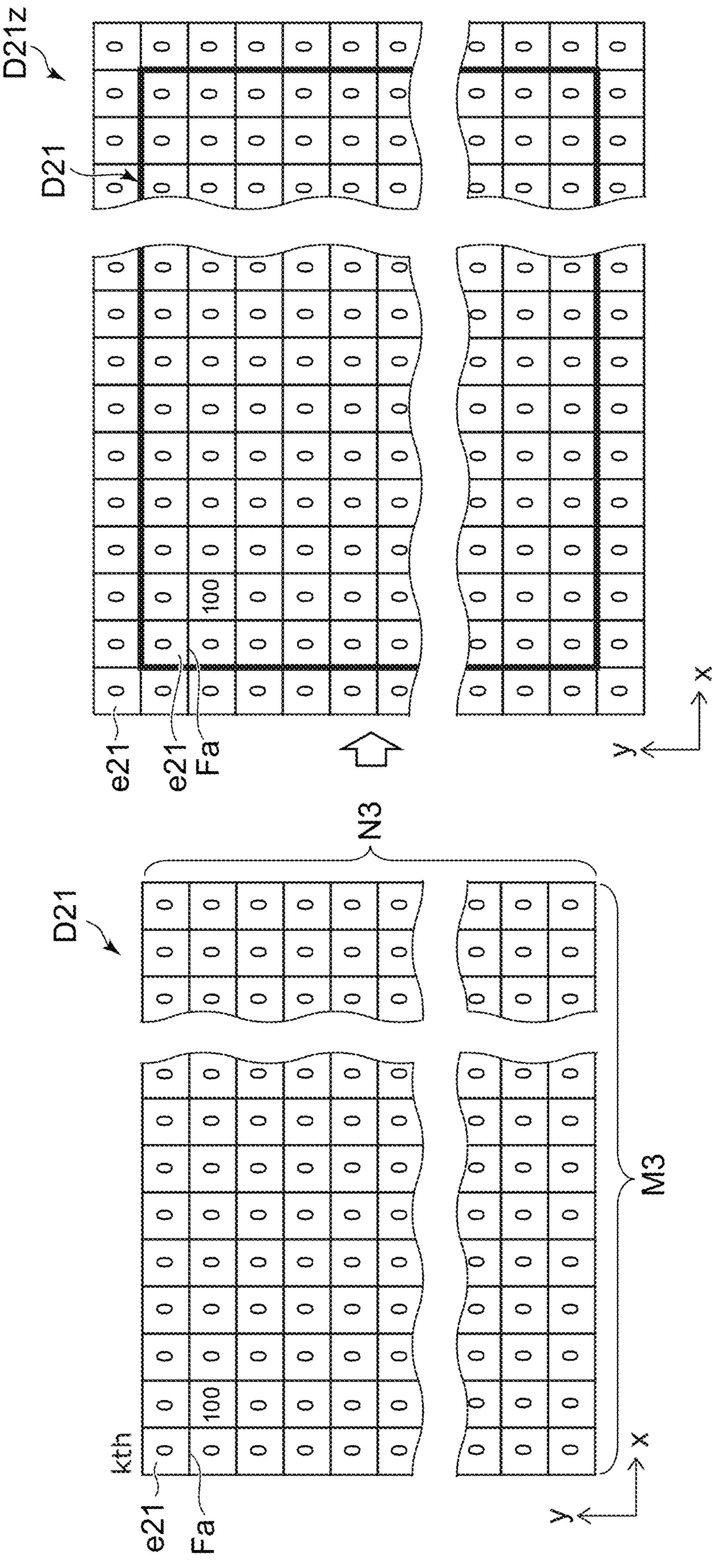
FIGS. 21-23 are schematic diagrams showing processes of generating the kth post-filtering data in the image display method according to the second embodiment.
Figure 22:
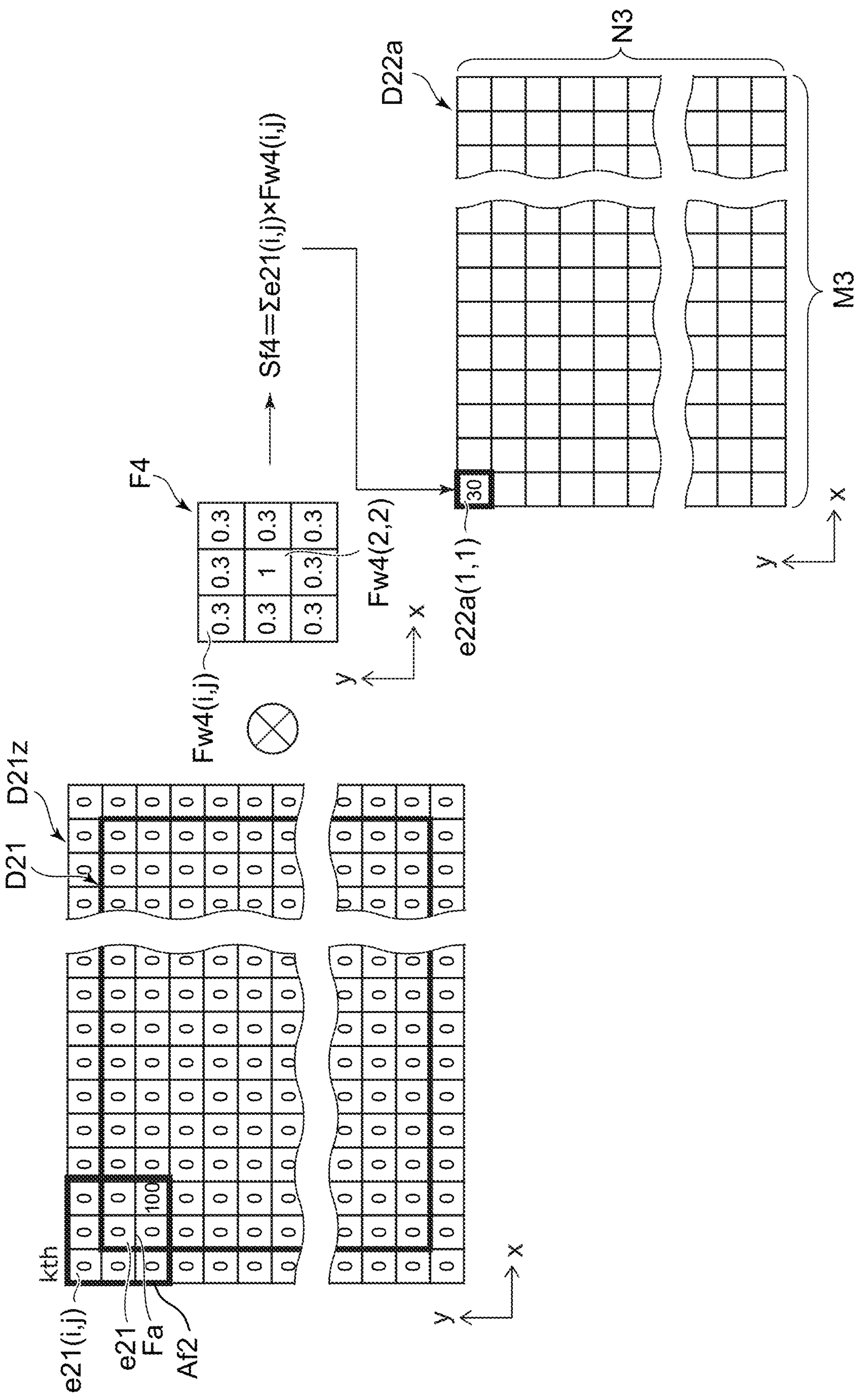
Figure 23:
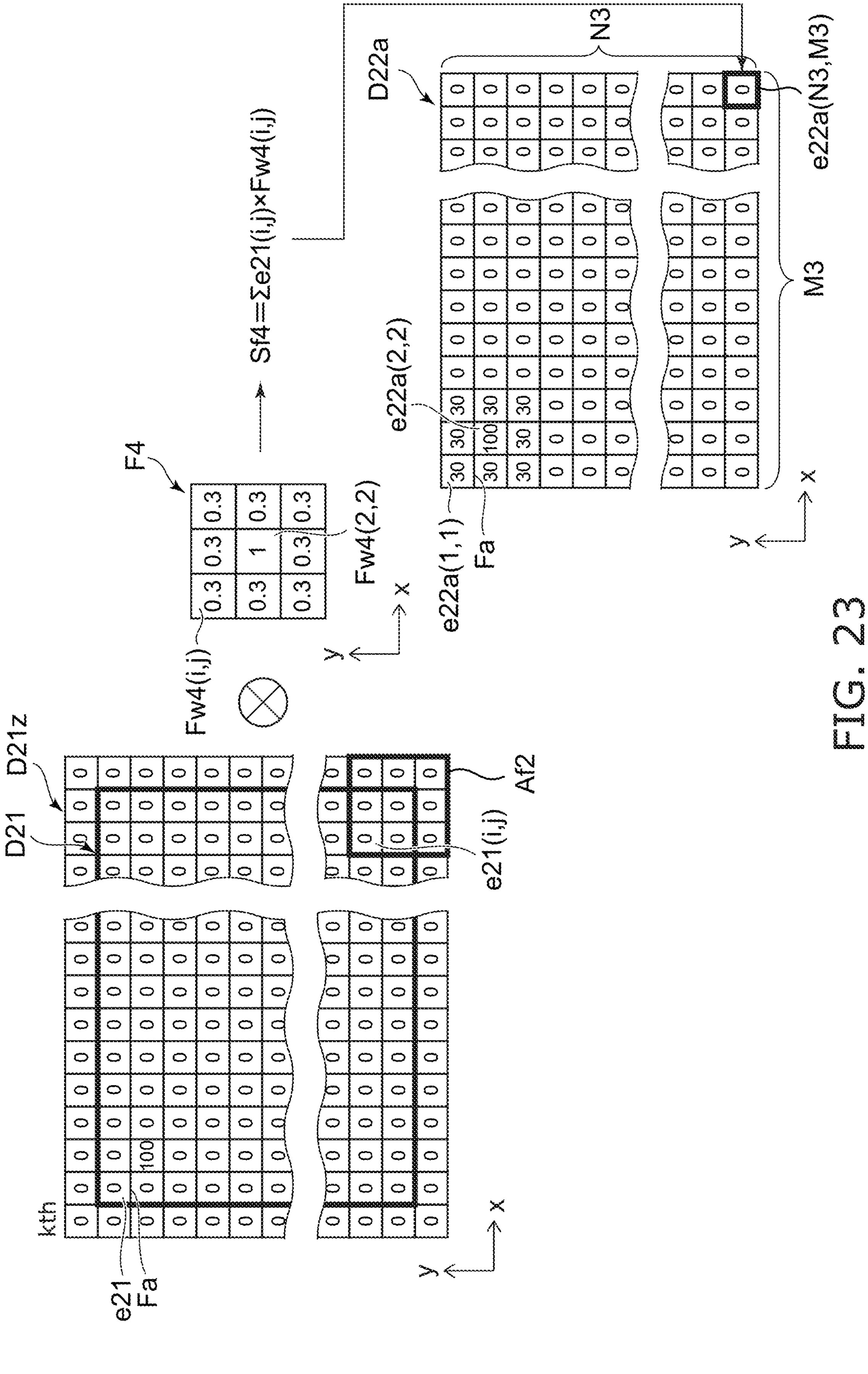

FIGS. 21 to 23 are schematic diagrams showing a process of generating the kth post-filtering data in the image display method according to the second embodiment.

As shown in FIG. 23, the post-filtering data generator 253*e* generates the post-filtering data D22*a* by applying a spatial filter F4 to the kth luminance data D21 to reduce the luminance difference of the adjacent elements e21, i.e., the adjacent filter application areas Fa.

The spatial filter F4 is prestored in the memory 152. According to the second embodiment, the spatial filter F4 includes multiple weighting factors Fw4 arranged in a matrix configuration. In the example shown in the second embodiment, the spatial filter F4 is a matrix of three rows and three columns. However, the number of rows and the number of columns of the spatial filter F4 are not limited to the aforementioned numbers. Hereinbelow, the weighting factor Fw4 at the ith row and the jth column also is called the weighting factor Fw4(*i, j*). Here, i and j each are any integer from 1 to 3.

According to the second embodiment, the value of the weighting factor Fw4(2, 2) at the center of the spatial filter F4 is greater than the values of the other weighting factors Fw4. However, the values of the weighting factors of the spatial filter are not particularly limited as long as the luminance difference between adjacent filter application areas can be reduced.

A specific example of the process of generating the post-filtering data D22*a* will now be described.

First, as shown in FIG. 21, the post-filtering data generator 253*e* adds the elements e21 at the periphery of the kth luminance data D21 so that the values thereof are equal to the values of the adjacent elements. The luminance data D21 is enlarged thereby. Alternatively, the values of the elements added at the periphery of the luminance data may be 0 (zero). In other words, zero padding of the luminance data may be performed. Hereinbelow, the data including the added elements e21 at the periphery of the luminance data D21 is called enlarged luminance data D21*z*.

Then, as shown in FIG. 22, the post-filtering data generator 253*e* extracts a region Af2 that has the same size as the spatial filter F4 and is furthest at the −x side and furthest at the +y side in the enlarged luminance data D21*z*.

Next, the post-filtering data generator 253*e* calculates the product of e21(*i, j*)×Fw4(*i, j*) by multiplying the element e21(*i, j*) at the ith column and the jth column in this region Af2 by the weighting factor Fw4(*i, j*) at the ith column and the jth column of the spatial filter F4. The post-filtering data generator 253*e* performs the calculation of the product of e21(*i, j*)×Fw4(*i, j*) for all elements e21(*i, j*) included in this region Af2.

Then, the post-filtering data generator 253*e* calculates a sum Sf4 by summing all of the products of e21(*i, j*)×Fw4(*i, j*) calculated for one region Af2.

Next, the post-filtering data generator 253*e* uses the sum Sf4 as the value of an element e22*a*(1, 1) at the first row and the first column of the kth post-filtering data D22*a*. In other words, the post-filtering data generator 253*e* performs a multiply-add operation of the element e21(*i, j*) of the region Af2 and the weighting factor Fw4(*i, j*) of the spatial filter F4.

Then, the post-filtering data generator 253*e* shifts the region Af2 in the enlarged luminance data D21*z* one column at a time in the +x direction, and performs the multiply-add operation of the element e21(*i, j*) of the region Af2 and the weighting factor Fw4(*i, j*) of the spatial filter F4 for each shift. After the multiply-add operation is performed for the region Af2 positioned furthest at the +x side, the post-filtering data generator 253*e* shifts the region Af2 to be located furthest at the −x side and shifted one row in the −y direction, and performs the multiply-add operation. Then, the post-filtering data generator 253*e* shifts the region Af2 in the enlarged luminance data D21*z* one column at a time in the +x direction and performs the multiply-add operation of the element e21(*i, j*) of the region Af2 and the weighting factor Fw4(*i, j*) of the spatial filter F4 for each shift.

By repeating the processing described above, finally, as shown in FIG. 23, the region Af2 is furthest at the +x side and furthest at the −y side in the enlarged luminance data D21*z*. Then, the post-filtering data generator 253*e* performs the multiply-add operation of the element e21(*i, j*) included in this region Af2 and the weighting factor Fw4(*i, j*) of the spatial filter F. The sum Sf4 is calculated thereby. Then, the post-filtering data generator 253*e* uses the sum Sf4 as the value of the element e22*a*(N3, M3) at the final row and the final column of the post-filtering data D22*a*.

The post-filtering data D22*a* thus obtained is data of a matrix configuration of N3 rows and M3 columns. Similarly to the elements e21 of the luminance data D21, the elements e22*a* of the post-filtering data D22*a* correspond to the filter application areas Fa.

In the kth post-filtering data D22*a*, the values of the element e22*a*(2, 2) at the second row and the second column and the elements e22*a* adjacent to the element e22*a*(2, 2) are greater than 0; and the values of the other elements e22*a* are 0.

The post-filtering data generator 253*e* stores the post-filtering data D22*a* in the memory 152.

The generation process S23*b* of the kth luminance setting data D22*b* will now be described.

Figure 24:
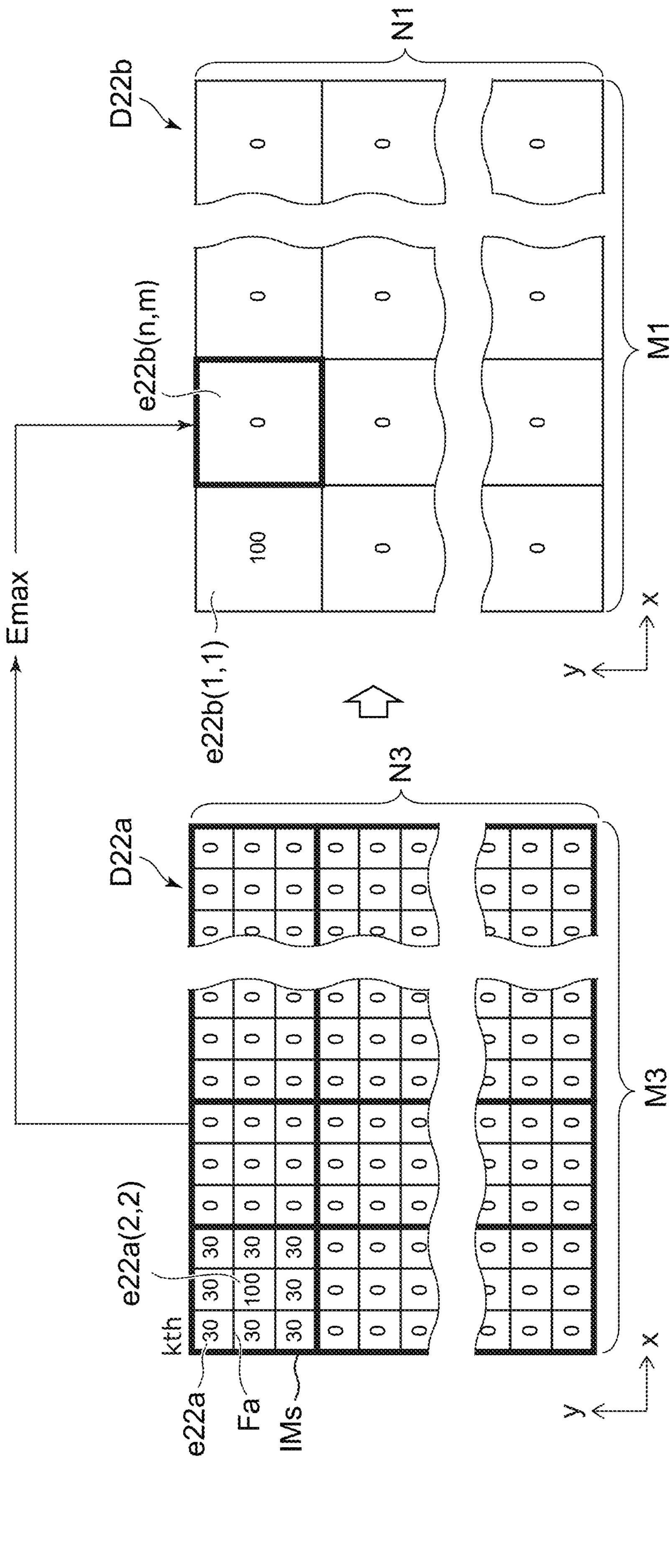
FIG. 24 is a schematic diagram showing a process of generating kth luminance setting data in the image display method according to the second embodiment.

FIG. 24 is a schematic diagram showing a process of generating the kth luminance setting data in the image display method according to the second embodiment.

The luminance setting data generator 153*b* generates the kth luminance setting data D22*b* based on the kth post-filtering data D22*a*.

Specifically, the luminance setting data generator 153*b* determines a maximum value Emax of the values of the multiple filter application areas Fa, i.e., the multiple elements e22*a*, included in the area IMs at the nth row and the mth column of the kth post-filtering data D22*a*. Here, n is any integer from 1 to N1; and m is any integer from 1 to M1.

The luminance setting data generator 153*b* uses the maximum value Emax as the value of an element e22*b*(*n, m*) at the nth row and the mth column of the kth luminance setting data D22*b*. The luminance setting data generator 153*b* performs this processing for all of the areas IMs.

The luminance setting data D22*b* thus obtained is data of a matrix configuration of N1 rows and M1 columns. The value of the element e22*b*(*n, m*) at the nth row and the mth column corresponds to the setting value of the luminance of the light-emitting region 110*s* positioned at the nth row and the mth column.

In the kth post-filtering data D22*a*, the element e22*a*(2, 2) at the second row and the second column and its neighboring elements e22*a* that are adjacent to the element e22*a*(2, 2) are included in the area IMs at the first row and the first column. As a result, in the luminance setting data D22*b*, the value of the element e22*b*(1, 1) at the first row and the first column, i.e., the setting value of the luminance of the light-emitting region 110*s* positioned at the first row and the first column, is greater than 0. The setting values of the luminances of the other light-emitting regions 110*s* are 0.

The luminance setting data generator 153*b* stores the luminance setting data D22*b* in the memory 152.

A processing method of the (k+1)th input image IM will now be described.

Figure 25:
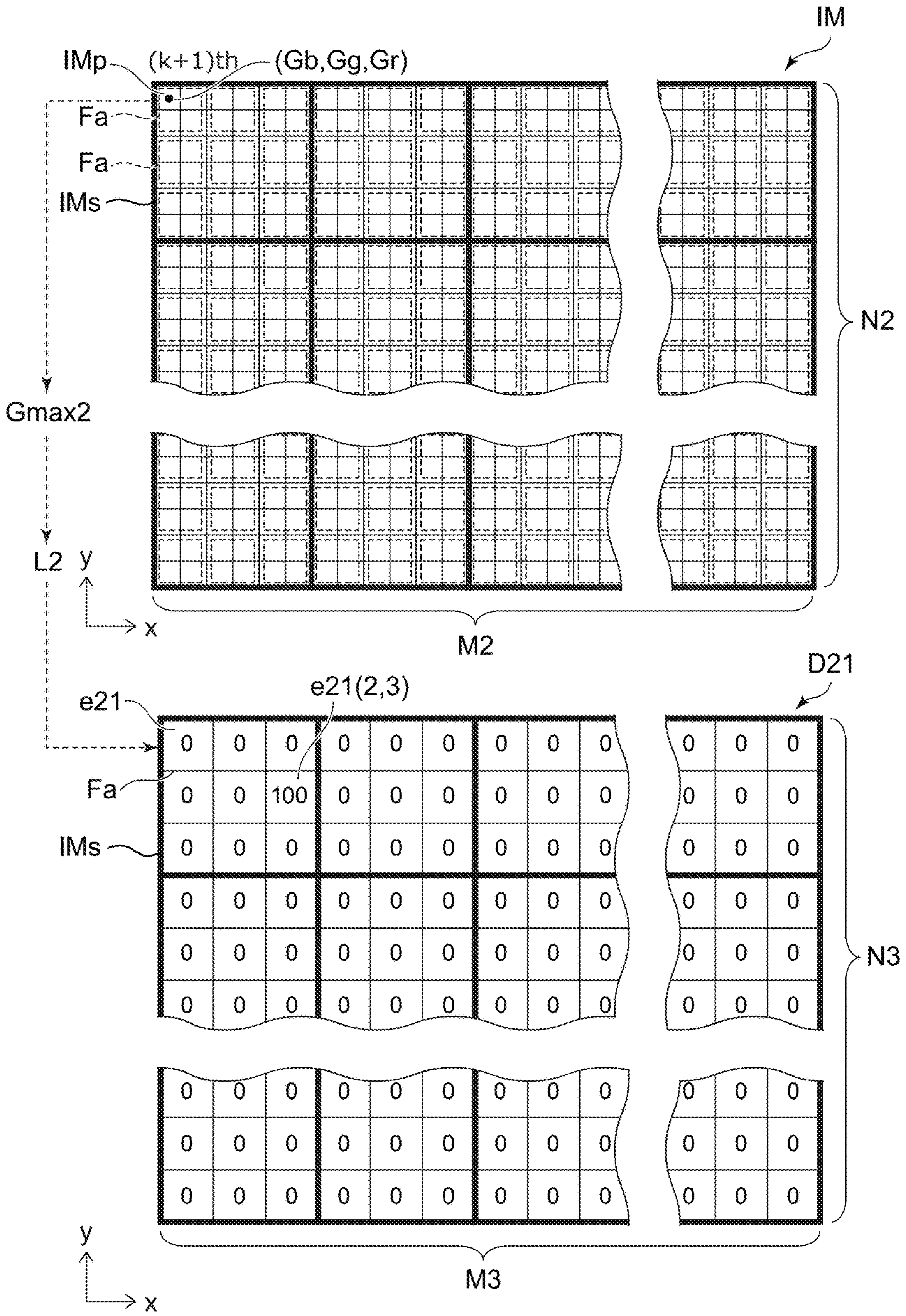
FIG. 25 is a schematic diagram showing a process of generating (k+1)th luminance data in the image display method according to the second embodiment.

FIG. 25 is a schematic diagram showing a process of generating the (k+1)th luminance data in the image display method according to the second embodiment.

Figure 26:
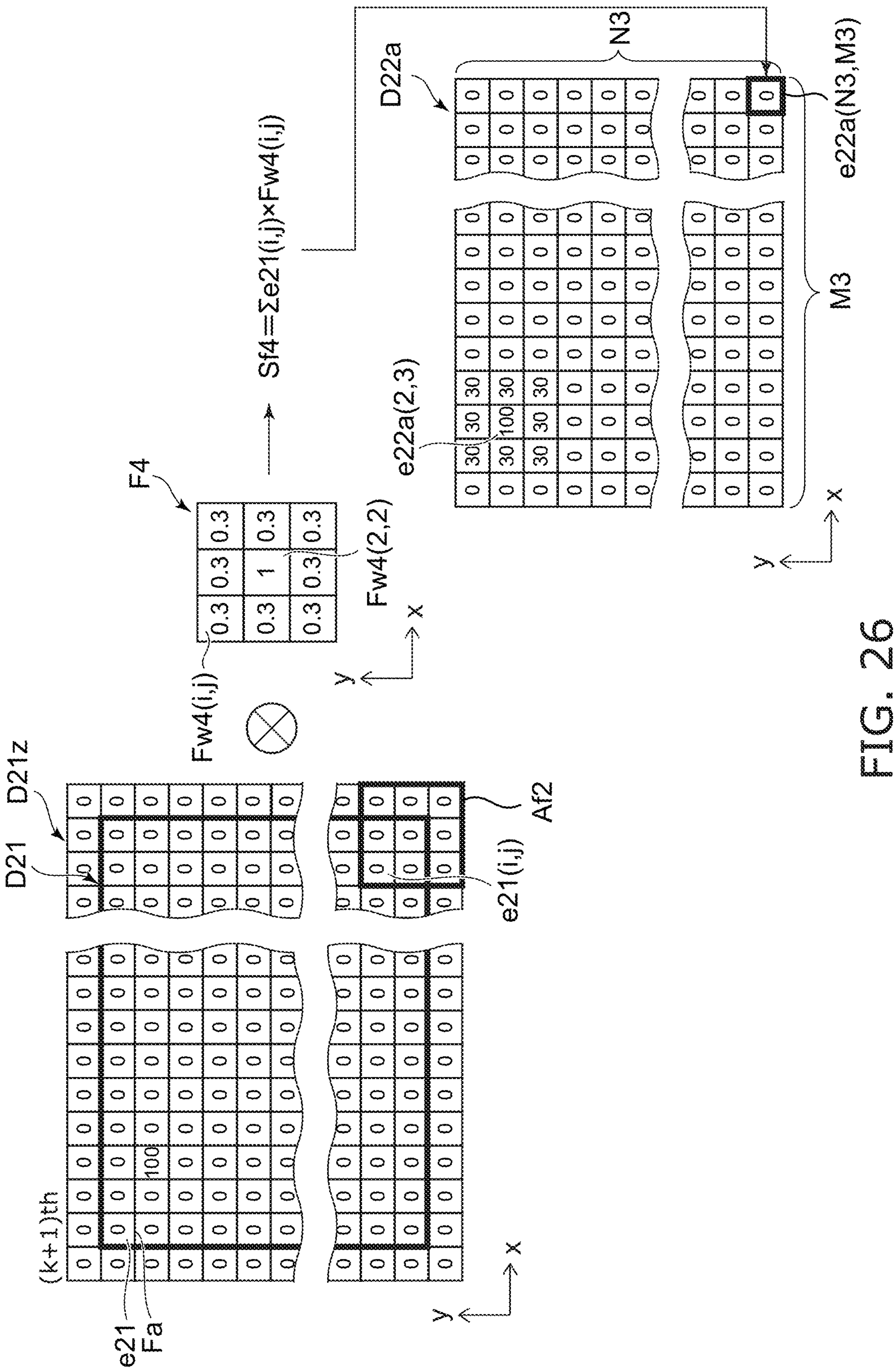
FIG. 26 is a schematic diagram showing a process of generating (k+1)th post-filtering data in the image display method according to the second embodiment.

FIG. 26 is a schematic diagram showing a process of generating the (k+1)th post-filtering data in the image display method according to the second embodiment.

Figure 27:
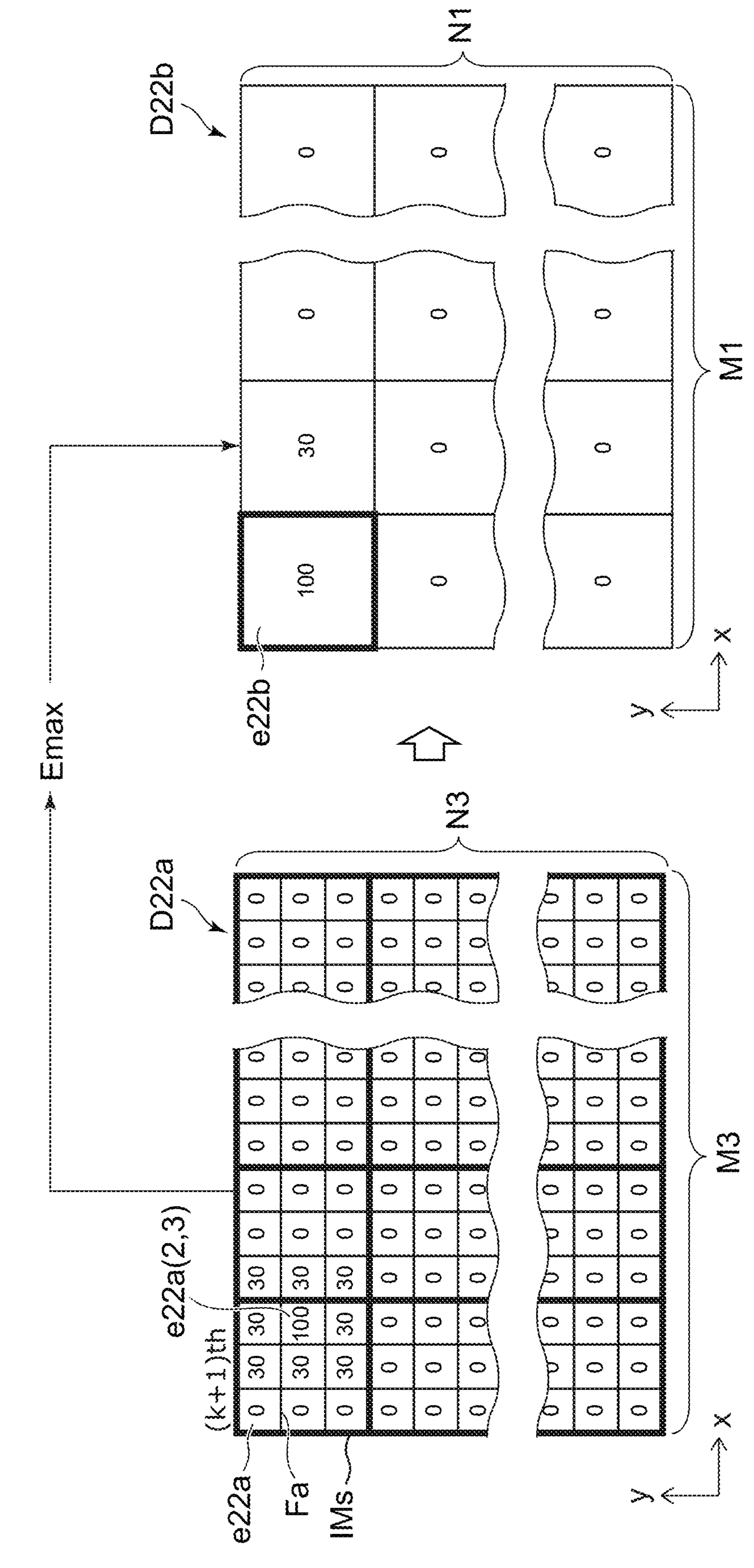
FIG. 27 is a schematic diagram showing a process of generating (k+1)th luminance setting data in the image display method according to the second embodiment.

FIG. 27 is a schematic diagram showing a process of generating the (k+1)th luminance setting data in the image display method according to the second embodiment.

As shown in FIG. 25, the luminance data generator 153*a* performs a process similar to the process of generating the kth luminance data D21, to generate the (k+1)th luminance data D21 based on the (k+1)th input image IM. As described above, the (k+1)th input image IM is an image including bright pixels IMp at the third row and the fifth column, the third row and the sixth column, the fourth row and the fifth column, and the fourth row and the sixth column, and the other darker pixels IMp. In the (k+1)th luminance data D21 hereinbelow, the value of the element e21(2, 3) at the second row and the third column is assumed to be greater than 0; and the values of the other filter application areas Fa are assumed to be 0.

As shown in FIG. 26, the post-filtering data generator 253*e* performs a process similar to the process of generating the (k+1)th post-filtering data D22*a*, to generate the post-filtering data D22*a* by applying the spatial filter F4 to the (k+1)th luminance data D21. Thereby, in the (k+1)th post-filtering data D22*a*, the values of the element e22*a*(2, 3) at the second row and the third column and the neighboring elements e22*a* adjacent to the element e22*a*(2, 3) are greater than 0; and the values of the other elements e22*a* are 0.

As shown in FIG. 27, the luminance setting data generator 153*b* performs a process similar to the process of generating the kth luminance setting data D22*b*, to generate the (k+1)th luminance setting data D22*b* based on the post-filtering data D22*a*. In the (k+1)th post-filtering data D22*a*, the element e22*a*(2, 3) and a portion of the neighboring elements e22*a* adjacent to the element e22*a*(2, 3) are included in the area IMs at the first row and the first column; and the other portion of the neighboring elements e22*a* adjacent to the element e22*a*(2, 3) is included in the area IMs at the first row and the second column. Therefore, the setting value of the luminance of the light-emitting region 110*s* positioned at the first row and the first column and the setting value of the luminance of the light-emitting region 110*s* positioned at the first row and the second column are greater than 0; and the setting values of the luminances of the other light-emitting regions 110*s* are 0.

In such a manner, by applying the spatial filter F4 to the luminance data D21 including multiple filter application areas Fa in each area IMs, when the vicinity of the boundary between the adjacent areas IMs of the input image IM is bright as in the (k+1)th input image IM, both of the two light-emitting regions 110*s* that correspond to the adjacent areas IMs can be lit, and the luminances of the light-emitting regions 110*s* can be adjusted. The effects obtained from this light-emission of the light-emitting regions 110*s* will now be elaborated.

Figure 28:
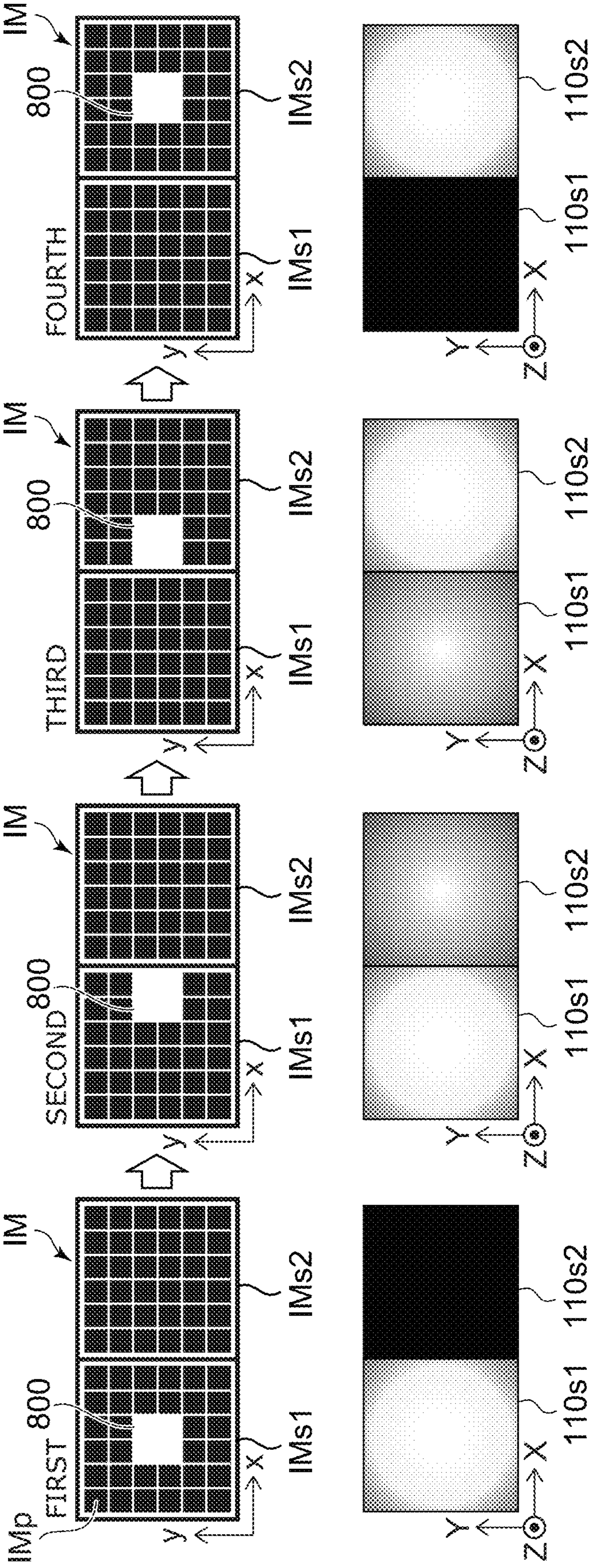
FIG. 28 is a schematic diagram showing luminance distributions of two areas of multiple consecutive input images, and two light-emitting regions that correspond to the two areas.

FIG. 28 is a schematic diagram showing luminance distributions of two areas of multiple consecutive input images, and two light-emitting regions that correspond to the two areas.

Hereinbelow, the two areas IMs that are arranged in the +x direction in each input image IM are called a first area IMs1 and a second area IMs2 in this order. The light-emitting region 110*s* that corresponds to the first area IMs1 is called a first light-emitting region 110*s*1; and the light-emitting region 110*s* that corresponds to the second area IMs2 is called a second light-emitting region 110*s*2.

Similarly to the kth input image IM of FIG. 19A, the first input image IM is an image including a brighter rectangular region 800 that includes the pixels IMp at the third row and the third column, the third row and the fourth column, the fourth row and the third column, and the fourth row and the fourth column, and the other daker pixels IMp. When the rectangular region 800 moves two columns in the +x direction between the input images from the first input image IM to the fourth input image IM in this order, the setting values of the luminances of the corresponding two light-emitting regions 110*s* are as follows.

In the first input image IM, similarly to the processing method of the kth input image IM described above, the setting value of the luminance of the first light-emitting region 110*s*1 is greater than 0, and the setting value of the luminance of the second light-emitting region 110*s*2 is 0. Accordingly, the light source 114 of the first light-emitting region 110*s*1 is lit, and the light source 114 of the second light-emitting region 110*s*2 is unlit. At this time, according to the structure of the planar light source 111, the luminance distribution in the first light-emitting region 110*s*1 may become nonuniform, and the luminance of the outer perimeter portion of the first light-emitting region 110*s*1 may become less than the luminance of the central portion. However, in the first input image IM, the rectangular region 800 is positioned directly above the central portion of the first light-emitting region 110*s*1. For that reason, the rectangular region 800 that is displayed on the liquid crystal panel 130 is less likely to be affected by the luminance distribution in the first light-emitting region 110*s*1.

In the second input image IM, similarly to the processing method of the (k+1)th input image IM described above, both of the setting value of the luminance of the first light-emitting region 110*s*1 and the setting value of the luminance of the second light-emitting region 110*s*2 are greater than 0. Accordingly, the light sources 114 of the first and second light-emitting regions 110*s*1 and 110*s*2 are lit. In the second input image IM, the rectangular region 800 is positioned directly above the +x direction end portion of the first light-emitting region 110*s*1. Therefore, the output of the light source 114 of the second light-emitting region 110*s*2 is less than the output of the light source 114 of the first light-emitting region 110*s*1. Although the luminance of the outer perimeter portion of the first light-emitting region 110*s*1 may become less than the luminance of the central portion as described above, according to the second embodiment, the reduction of the luminance of the rectangular region 800 displayed on the liquid crystal panel 130 can be suppressed by also lighting the light source 114 of the second light-emitting region 110*s*2.

In the third input image IM, similarly to the second input image IM, both of the setting value of the luminance of the first light-emitting region 110*s*1 and the setting value of the luminance of the second light-emitting region 110*s*2 are greater than 0. However, in the third input image IM, the rectangular region 800 is positioned directly above the +x direction end portion of the second light-emitting region 110*s*2. Therefore, the output of the light source 114 of the first light-emitting region 110*s*1 is less than the output of the light source 114 of the second light-emitting region 110*s*2. Although the luminance of the outer perimeter portion of the second light-emitting region 110*s*2 may become less than the luminance of the central portion, according to the second embodiment, the reduction of the luminance of the rectangular region 800 displayed on the liquid crystal panel 130 can be suppressed by also lighting the light source 114 of the first light-emitting region 110*s*1.

In the fourth input image IM, the setting value of the luminance of the first light-emitting region 110*s*1 is 0, and the setting value of the luminance of the second light-emitting region 110*s*2 is greater than 0. In the fourth input image IM, the rectangular region 800 is positioned directly above the central portion of the second light-emitting region 110*s*2. Therefore, the rectangular region 800 that is displayed on the liquid crystal panel 130 is not easily affected by the luminance distribution in the second light-emitting region 110*s*2.

In such a manner, when a video image including a bright moving rectangular region 800 is displayed on the liquid crystal panel 130 by using the multiple consecutive input images IM, unintentional change of the luminance of the image due to the movement can be suppressed.

Effects of the second embodiment will now be described.

According to the second embodiment, the image display method includes the process S22 of generating the luminance data D21, the process S23*a* of generating the post-filtering data, and the process S23*b* of generating the luminance setting data.

In the process S22 of generating the luminance data D21, the maximum gradation of each of the multiple filter application areas Fa of the input image IM is converted into a luminance, and the multiple filter application areas Fa are generated by dividing each of the areas IMs that correspond to the light-emitting regions 110*s* into a plurality.

In the process S23*a* of generating the post-filtering data, the post-filtering data D22*a* is generated by applying the spatial filter F4 to the luminance data D21 to reduce the luminance difference of the adjacent filter application areas Fa.

In the process S23*b* of generating the luminance setting data, the setting values of the luminances of the light-emitting regions 110*s* of the backlight 110 are determined based on the post-filtering data D22*a*.

According to the second embodiment as well, similarly to the first embodiment, the halo phenomenon can be suppressed. By applying the spatial filter F4 to the luminance data D21 in which each of the areas IMs corresponding to the light-emitting regions 110*s* is subdivided into multiple filter application areas Fa, the image of the liquid crystal panel 130 displayed directly above the outer perimeter portion of one light-emitting region 110*s* can be prevented from being dark. In particular, a change of the brightness of the image due to the movement can be suppressed when displaying a video image in which an image of an icon of a mouse or the like moves in the liquid crystal panel 130.

For example, the invention can utilized in the display of a device such as a television, a personal computer, a game machine, etc.

What is claimed is:

1. An image display method comprising:

generating luminance data that indicates a luminance value for each of a plurality of light-emitting regions of a backlight configured in a matrix form based on a maximum gradation value among gradation values of image pixels of an input image that correspond to the light-emitting region;

applying a special filter to the luminance data, such that, with respect to each of the light-emitting regions, a difference of the luminance value thereof from the luminance values of neighboring light-emitting regions thereof decreases, to generate luminance setting data;

generating gradation setting data that sets a gradation value of each of a plurality of pixels of a liquid crystal panel coupled to the backlight for the input image, based on the input image and the luminance setting data; and controlling the backlight to operate based on the luminance setting data and the liquid crystal panel to operate based on the gradation setting data to display an image corresponding to the input image, wherein said applying a special filter comprises: with respect to each of the light-emitting regions of the backlight, calculating a sum of the luminance value thereof multiplied by a weighting factor of the special filter corresponding thereto and the luminance values of the neighboring light-emitting regions multiplied by weighting factors of the special filter corresponding thereto, respectively, and wherein said generating gradation setting data comprises:

generating luminance estimation data that indicates an estimated luminance value of backlight for the input image with respect to each of the pixels of the liquid crystal panel based on the luminance setting data and luminance distribution data indicating a luminance distribution in each of the light-emitting regions of the backlight panel; and performing correction of gradation values of image pixels indicated by the input image using the luminance estimation data, to generate the gradation setting data.

2. The image display method according to claim 1, wherein the calculated sum is a luminance value of the light-emitting region set in the luminance setting data.

3. The image display method according to claim 1, wherein the weighting factors of the special filter corresponding to the neighboring light-emitting regions are less than the weighting factor of the special filter corresponding to the light-emitting region.

4. The image display method according to claim 1, wherein the neighboring light-emitting regions are at most eight light-emitting regions within one row and one column from the light-emitting region.

5. The image display method according to claim 4, wherein the special filter comprises a three-by-three matrix.

6. The image display method according to claim 1, wherein the special filter includes one of a Gaussian filter, an averaging filter, and a median averaging filter.

7. The image display method according to claim 1, wherein a sum of weighting factors of the special filter is one.

8. The image display method according to claim 1, wherein a sum of weighting factors of the special filter is greater than one.

9. The image display method according to claim 1, wherein each of the light-emitting regions of the backlight panel corresponds to a plurality of pixels of the liquid crystal panel.

10. The image display method according to claim 1, wherein each of the light-emitting regions of the backlight corresponds to a single light-emitting element.

11. An image display method comprising:

generating luminance data that indicates a luminance value for each of a plurality of sub-divided areas included in each of a plurality of light-emitting regions of a backlight configured in a matrix form based on a maximum gradation value among gradation values of image pixels of an input image that correspond to the light-emitting region, each of the light-emitting regions corresponding to one light-emitting element;

applying a special filter to the luminance data, such that, with respect to each of the sub-divided areas, a difference of the luminance value thereof from the luminance values of neighboring sub-divided areas thereof decreases, to generate post-filtering luminance data;

generating luminance setting data that sets a luminance value for each of the light-emitting regions of the backlight based on a maximum luminance value among luminance values of the sub-divided areas included in the light-emitting region indicated by the post-filtering luminance data;

generating gradation setting data that sets a gradation value of each of a plurality of pixels of a liquid crystal panel coupled to the backlight for the input image, based on the input image and the luminance setting data; and controlling the backlight to operate based on the luminance setting data and the liquid crystal panel to operate based on the gradation setting data to display an image corresponding to the input image, wherein said applying a special filter comprises: with respect to each of the sub-divided areas of the light-emitting regions of the backlight, calculating a sum of the luminance value thereof multiplied by a weighting factor of the special filter corresponding thereto and the luminance values of the neighboring sub-divided areas multiplied by weighting factors of the special filter corresponding thereto, respectively.

12. The image display method according to claim 11, wherein the weighting factors of the special filter corresponding to the neighboring light-emitting regions are less than the weighting factor of the special filter corresponding to the light-emitting region.

13. The image display method according to claim 11, wherein the neighboring sub-divided areas are at most eight sub-divided areas within one row and one column from the sub-divided area.

14. A display comprising:

a backlight including a plurality of light-emitting regions that are configured in a matrix form and independently operable;

a liquid crystal panel coupled to the backlight panel and including a plurality of pixels; and a controller configured to:

generate luminance data that indicates a luminance value for each of the light-emitting regions of the backlight based on a maximum gradation value among gradation values of image pixels of an input image that correspond to the light-emitting region;

apply a special filter to the luminance data, such that, with respect to each of the light-emitting regions, a difference of the luminance value thereof from the luminance values of neighboring light-emitting regions thereof decreases, to generate luminance setting data;

generate gradation setting data that sets a gradation value of each of the pixels of the liquid crystal panel for the input image, based on the input image and the luminance setting data; and control the backlight to operate based on the luminance setting data and the liquid crystal panel to operate based on the gradation setting data to display an image corresponding to the input image, wherein the controller is configured to, during application of the special filter, with respect to each of the light-emitting regions of the backlight, calculate a sum of the luminance value thereof multiplied by a weighting factor of the special filter corresponding thereto and the luminance values of the neighboring light-emitting regions multiplied by weighting factors of the special filter corresponding thereto, respectively, and the controller is configured to, during generation of the gradation setting data:

generate luminance estimation data that indicates an estimated luminance value of backlight for the input image with respect to each of the pixels of the liquid crystal panel based on the luminance setting data and luminance distribution data indicating a luminance distribution in each of the light-emitting regions of the backlight panel; and perform correction of gradation values of image pixels indicated by the input image using the luminance estimation data, to generate the gradation setting data.

15. The display according to claim 14, wherein the calculated sum is a luminance value of the light-emitting region set in the luminance setting data.

16. The display according to claim 14, wherein the weighting factors of the special filter corresponding to the neighboring light-emitting regions are less than the weighting factor of the special filter corresponding to the light-emitting region.

17. The display according to claim 14, wherein the neighboring light-emitting regions are at most eight light-emitting regions within one row and one column from the light-emitting region.

18. The display according to claim 14, wherein the special filter comprises a three-by-three matrix.

19. The display according to claim 14, wherein the special filter includes one of a Gaussian filter, an averaging filter, and a median averaging filter.

20. The display according to claim 14, wherein a sum of weighting factors of the special filter is one.

* * * * *